United States Patent
Faraji et al.

(10) Patent No.: US 12,333,855 B1
(45) Date of Patent: Jun. 17, 2025

(54) AUTOMATED SYSTEM FOR GENERATING PERSONALIZED EYEWEAR RECOMMENDATIONS BASED ON FIT AND STYLE WITHIN A PURCHASING SYSTEM

(71) Applicant: Eyevious Style Incorporated, Calgary (CA)

(72) Inventors: Mehdi Faraji, Vancouver (CA); Gregory Matthews, Calgary (CA); Niharika Khandelwal, Edmonton (CA); Gaurav Mishra, Edmonton (CA); Maryam Beikmohammadloo, Edmonton (CA); Amir Narimani, Edmonton (CA); Ava Sehat-Niaki, Edmonton (CA)

(73) Assignee: Eyevious Style Incorporated, Calgary (CA)

( * ) Notice: Subject to any disclaimer, the term of this patent is extended or adjusted under 35 U.S.C. 154(b) by 103 days.

(21) Appl. No.: 17/345,356

(22) Filed: Jun. 11, 2021

Related U.S. Application Data

(60) Provisional application No. 63/037,835, filed on Jun. 11, 2020.

(51) Int. Cl.
*G06T 7/70* (2017.01)
*G06F 18/2113* (2023.01)
*G06Q 30/0251* (2023.01)
*G06V 40/16* (2022.01)

(52) U.S. Cl.
CPC ........ *G06V 40/171* (2022.01); *G06F 18/2113* (2023.01); *G06Q 30/0269* (2013.01); *G06T 7/70* (2017.01); *G06T 2207/30201* (2013.01)

(58) Field of Classification Search
CPC ............ G06V 40/171; G06T 7/70; G06T 2207/30201; G06F 18/2113; G06Q 30/0269
See application file for complete search history.

(56) References Cited

U.S. PATENT DOCUMENTS

| | | | |
|---|---|---|---|
| 2013/0088490 A1* | 4/2013 | Rasmussen | G06T 19/006 345/421 |
| 2015/0055086 A1* | 2/2015 | Fonte | G06F 16/22 700/98 |
| 2018/0096537 A1* | 4/2018 | Kornilov | G06V 20/20 |
| 2022/0036658 A1* | 2/2022 | Andoche | G06V 20/30 |
| 2022/0207331 A1* | 6/2022 | Andoche | G06Q 30/0282 |

* cited by examiner

*Primary Examiner* — Syed Haider
(74) *Attorney, Agent, or Firm* — Smith, Gambrell & Russell LLP

(57) ABSTRACT

A system and method for generating personalized product recommendations for a user, along with the personalized reasons for the recommendation, which can then be used as part of a product purchasing system to deliver that product to the user. A system for image analysis may perform: obtaining an image of a face or head of a person, generating face features from the image, retrieving a plurality of features of a plurality of objects from a database, generating a plurality of combined face and object features from the face features and object features of the plurality of objects, generating a ranking of the combined face and object features, selecting at least one object based on the ranking of the combined face and object features, generating an interactive display of the selected at least one object, and providing user interaction of the interactive display to provide purchase of the selected object.

60 Claims, 23 Drawing Sheets

WHY THESE FRAMES WILL LOOK GREAT ON YOU

Now you're styling. The shape, size and fit are a great complement to your features.

SHAPE

SIZE

BRIDGE

These frames are also a bit more rectangular than other designs. You have the face to carry them beautifully.

SHAPE : Glasses with a round or a rectangular shape are particularly befitting for you!

SIZE : M sized frames fit you best but S/M size will also work.

BRIDGE : Frames that have a nose pads bridge are a great fit for your nose.

AUTOMATED SYSTEM FOR GENERATING PERSONALIZED EYEWEAR RECOMMENDATIONS BASED ON FIT AND STYLE WITHIN A PURCHASING SYSTEM

CROSS-REFERENCE TO RELATED APPLICATIONS

This application claims the benefit of U.S. Provisional Application No. 63/037,835, filed Jun. 11, 2020, the contents of which are incorporated by reference herein.

BACKGROUND

The present invention relates to an automated system for generating personalized eyewear recommendations based on fit and style within a purchasing system.

Buying eyeglasses can be a challenging task. There are thousands of eyewear options to choose from but no simple, efficient and effective way for shoppers to evaluate them all against their needs and wants. Individual frames all have their own fit and style. Similarly individual shoppers have their own unique faces and style. For shoppers, sorting through all the available frame options to find a great match is a daunting task. Online shopping models force the user to face this challenge on their own. And while in-store shopping models often allow the shopper to obtain help from in-store staff, the shopping process still involves significant trial and error and a considerable amount of effort before a good match is found.

A need arises for new systems and techniques that recommend properly fitted and styled eyeglasses and that aid people to choose properly fitting and properly styled eyeglass frames.

SUMMARY

The present invention relates to recommendation systems where the physical properties of the product and the user are relevant to the quality of the recommendation. In particular the present invention relates to an apparatus and method for developing a product recommendation for a user, where the method includes an evaluation of the physical properties of the product and the physical or anatomical properties of the user using computer vision, computer graphics, machine learning and statistical analysis and a knowledge-driven system of algorithms established through an offline, online or adaptive learning process to generate recommendations through a recommendation serving system. This apparatus and method may furthermore incorporate additional stylistic, social and usage properties of the product and the user when they are available. The present invention may be used to facilitate, as one example, an online recommendation of a product for a user and may be used to automatically enable the purchase of that recommended product by the user and the fulfillment of that recommended product to the user.

This invention pertains to applying machine learning techniques to train a computer to make recommendations for an individual for an accessory or worn item such as jewelry, headwear or eyeglasses. An electronic device is used to take a picture or pictures of a person's face, possibly from multiple profiles. Various artificial intelligence techniques like machine learning and facial recognition are used to analyze the face and to create a mathematical model of the face. A scaling aid may or may not be used to determine actual distance amongst facial features in the photograph. It then becomes possible to display various eyeglass frames on a person's face very accurately for the user to decide which frame to purchase.

The computer program may analyze their face and create a mathematical representation of their face-a canonical face. The computer program will match up many canonical frames with their face and calculate which frames achieve the highest recommendation score when coupled with this particular face. The recommendation score may be based on a computer model trained on the rankings of various frames and faces by human experts (opticians, stylists, influencers, friends, etc.) who may wish to advise the user. These experts may view and rate people wearing actual frames, live or in photographed images, but also may base their ratings on artificial mixtures of canonical frames with canonical faces.

The computer may also incorporate social data about the user in addition to the physical data to attempt to match the user to the experts (opticians, stylists, influencers, friends, etc.) with whom they have the greatest affinity and to give the rankings of those stylists more weight. Before this computer-human interaction can take place the various models must be trained. The facial recognition models must recognize a human face from one or several photos taken (either as stills from various poses or from single (still) frames of a video) and be able to create a canonical representation of the face. The eyeglass frames must be designed with a digital representation rendered in the canonical space and saved into a database. Further, other information may be used to assign at least one (and possibly several) models to a user to help evaluate which frames may be most suited to that person's face and personal style. The expert model is assigned based on much social and personal information about the person and about the expert. A library of ratings of face & frame combinations by human experts has been compiled. This library may be used to train the expert models to predict which traits of the face & frame combinations are deemed most attractive by that particular expert or experts. In embodiments, the social data on the user may be combined and compared with the social data of the various experts. A expert or experts may be selected who most closely resemble the user in terms of all the data (closest affinity between an expert and a user). In embodiments, the user may select an expert or experts based on other user dependent factors, rather than social data. The expert model then selects those eyeglass frames which are likely to be rated highest for the user's face & frame combination. In embodiments, these frames may be displayed to the user, and may be shown superimposed over the user's face, for the user to evaluate or a user summary is displayed to the user with a summary of the frames. The frames might be presented in groups and each group might be an archetype or a conventional collection, or a conceptual collection, or a physical collection. Displays may include 2D, videos, or interactive 3D. The user may be able to apply various filters on her recommendations. In addition to these displays, the user will be provided with reasons why this particular frame is a good fit for their face. These reasons are determined by the most important input vectors from the computer model. The user can select which frames they desire and purchase them. In embodiments, the human experts may have entered their rankings of styles of eyeglass frames on various human faces or ranked the various features. These frames and faces used for training the model—by having human experts evaluate them—may be either real in the physical sense, or they may be rendered objects only on a screen ("artificial"). The model will then work on determining which features of the frame: face interaction are the most important in determining a sense of highly ranked fit or suitability style or poorly ranked fit or suitability style. Only then can the process be automated. The user may then be shown various eyeglass frames rendered on their own face until they select at least one (and possibly several) which they like well enough to wish to purchase. They then order the item and pay for it and it is subsequently delivered to their preferred address.

In an embodiment, a system for image analysis may comprise a processor, memory accessible by the processor, and computer program instructions stored in the memory and executable by the processor to perform: obtaining an image of a face or head of a person, generating face features from the image of the face or head of the person, retrieving a plurality of features of a plurality of objects from a database of features of the plurality of objects, generating a plurality of combined face and object features from the face features and object features of the plurality of objects, generating a ranking of the combined face and object features, selecting at least one object based on the ranking of the combined face and object features, generating an interactive display of the selected at least one object to the person, and providing user interaction of the interactive display to provide purchase of the selected object.

In embodiments, the system may further comprise determining a scale of the image using an object or indicia of known dimensions present in the image. Generating the ranking may comprise evaluating the combined face and object features relative to expert ratings. The system may further comprise: extracting face landmarks from the image of the face or head of the person, and generating face features from the image of the face or head of the person based on the extracted face landmarks. The face landmarks may comprise locations and arrangements of anatomical features of the face or head of the person. The database of features of the plurality of objects may comprise parameters computed based on object landmarks, wherein the object landmarks may comprise locations and arrangements of components of the object and locations and arrangements of points on the object. Generating the ranking may comprise using features created from hand engineered relative face and object features related to at least one of: a relative distance of the eye of the user and a contour of the object when in a same coordinate system, a relative distance of a contour of the person's face and a contour of the object when in a same coordinate system, and a relative distance between an eye of the person and coordinates of a portion of the object when in a same coordinate system. The features may be used to infer classes of intermediate features related to object size-width relative to the face of the person. The features may be used to infer classes of intermediate features related to object size-height relative to the face of the person. The features may be used to infer classes of intermediate features related to object fit relative to the face of the person. Generating the ranking may comprise using predictor models to generate the ranking based on features. Generating the ranking may comprise using features created by extracting combined face and object features. Generating the face features may comprise extracting face features using deep learning models and image analysis. The features may be used to infer classes of intermediate features related to object size-width relative to the face of the person. The features may be used to infer classes of intermediate features related to object size-height relative to the face of the person. The features may be used to infer classes of intermediate features related to object fit relative to the face of the person. Generating the ranking may comprise using predictor models to generate the ranking based on features. The features of the plurality of objects may be generated by extracting object features using deep learning models.

In an embodiment, a system for image analysis to evaluate suitability of an eyewear product or a set of eyewear products for a person may comprise a processor, memory accessible by the processor, and computer program instructions stored in the memory and executable by the processor to perform: obtaining an image of a face or head of the person, generating face features from the image of the face or head of the person, retrieving a plurality of features of a plurality of eyewear products from a database of features of the plurality of eyewear products, generating a plurality of combined face and eyewear product features from the face features and eyewear product features of the plurality of eyewear products, generating a ranking of the combined face and eyewear product features, selecting at least one eyewear product based on the ranking of the combined face and eyewear product features, generating an interactive display of the selected at least one eyewear product to the person, and providing user interaction of the interactive display to provide purchase of the selected eyewear product.

In embodiments, the system may further comprise determining a scale of the image using an object or indicia of known dimensions present in the image. Generating the ranking may comprise evaluating the combined face and eyewear product features relative to expert ratings. The system may further comprise: extracting face landmarks from the image of the face or head of the person, and generating face features from the image of the face or head of the person based on the extracted face landmarks. The face landmarks may comprise locations and arrangements of anatomical features of the face or head of the person. The database of features of the plurality of eyewear products may comprise parameters computed based on eyewear product landmarks, wherein the eyewear product landmarks may comprise locations and arrangements of components of the eyewear product and locations and arrangements of points on the eyewear product. Generating the ranking may comprise using features created from hand engineered relative face and eyewear product features related to at least one of: a relative distance of the eye of the user and a contour of the eyewear product when in a same coordinate system, a relative distance of a contour of the person's face and a contour of the eyewear product when in a same coordinate system, and a relative distance between an eye of the person and coordinates of a lens of the eyewear product when in a same coordinate system. The features may be used to infer classes of intermediate features related to eyewear product size-width relative to the face of the person. The features may be used to infer classes of intermediate features related to eyewear product size-height relative to the face of the person. The features may be used to infer classes of intermediate features related to eyewear product fit relative to the face of the person. Generating the ranking may comprise using predictor models to generate the ranking based on features. Generating the ranking may comprise using features created by extracting combined face and eyewear product features. Generating the face features may comprise extracting face features using deep learning models and image analysis. The features may be used to infer classes of intermediate features related to eyewear product size-width relative to the face of the person. The features may be used to infer classes of intermediate features related to eyewear product size-height relative to the face of the person. The features may be used to infer classes of intermediate features related to eyewear product fit relative to the face of the person. Generating the ranking may comprise using predictor models to generate the ranking based on features. The features of the plurality of eyewear products may be generated by extracting eyewear product features using deep learning models.

In an embodiment, a system for image analysis to evaluate suitability for a person of an eyewear product or a set of eyewear products incorporating stylistic preferences may comprise a processor, memory accessible by the processor, and computer program instructions stored in the memory and executable by the processor to perform: obtaining an image of a face or head of a person, generating face features from the image of the face or head of the person, retrieving a plurality of features of a plurality of eyewear products from a database of features of the plurality of eyewear products, generating a plurality of combined face and eyewear product features from the face features and eyewear product features of the plurality of eyewear products, generating a ranking of the combined face and eyewear product features based on stylistic preferences of the person or another person and on expert ratings of the eyewear products, selecting at least one eyewear product based on the ranking of the combined face and eyewear product features, generating an interactive display of the selected at least one eyewear product to the person, and providing user interaction of the interactive display to provide purchase of the selected eyewear product.

In embodiments, the system may further comprise determining a scale of the image using an object or indicia of known dimensions present in the image. Generating the ranking may comprise evaluating the combined face and eyewear product features relative to expert ratings. The system may further comprise: extracting face landmarks from the image of the face or head of the person, and generating face features from the image of the face or head of the person based on the extracted face landmarks. The face landmarks may comprise locations and arrangements of anatomical features of the face or head of the person. The database of features of the plurality of eyewear products may comprise parameters computed based on eyewear product landmarks, wherein the eyewear product landmarks may comprise locations and arrangements of components of the eyewear product and locations and arrangements of points on the eyewear product. The system may further comprise obtaining stylistic preference feedback on a plurality of eyewear products. The system may further comprise learning user stylistic preferences on features of a plurality of eyewear product using parameters computed based on eyewear product features. The system may further comprise may further comprise the ranking and evaluation of combined face and eyewear product features relative to expert ratings adjusted for user stylistic preferences. Generating the ranking may comprise using features created from hand engineered relative face and eyewear product features related to at least one of: a relative distance of the eye of the user and a contour of the eyewear product when in a same coordinate system, a relative distance of a contour of the person's face and a contour of the eyewear product when in a same coordinate system, and a relative distance between an eye of the person and coordinates of a lens of the eyewear product when in a same coordinate system. The features may be used to infer classes of intermediate features related to eyewear product size-width relative to the face of the person. The features may be used to infer classes of intermediate features related to eyewear product size-height relative to the face of the person. The features may be used to infer classes of intermediate features related to eyewear product fit relative to the face of the person. Generating the ranking may comprise using predictor models to generate the ranking based on features. Generating the ranking may comprise using features created by extracting combined face and eyewear product features. Generating the face features may comprise extracting face features using deep learning models and image analysis. The system may further comprise obtaining stylistic preference feedback on a plurality of eyewear products. The system may further comprise learning user stylistic preferences on features of a plurality of eyewear product using parameters computed based on eyewear product features. The system may further comprise the ranking and evaluation of combined face and eyewear product features relative to expert ratings adjusted for user stylistic preferences. The features may be used to infer classes of intermediate features related to eyewear product size-width relative to the face of the person. The features may be used to infer classes of intermediate features related to eyewear product size-height relative to the face of the person. The features may be used to infer classes of intermediate features related to eyewear product fit relative to the face of the person. Generating the ranking may comprise using predictor models to generate the ranking based on features. The features of the plurality of eyewear products may be generated by extracting eyewear product features using deep learning models.

BRIEF DESCRIPTION OF THE DRAWINGS

Further features and advantages of the invention can be ascertained from the following detailed description that is provided in connection with the drawings described below.

DETAILED DESCRIPTION

Figure 1:
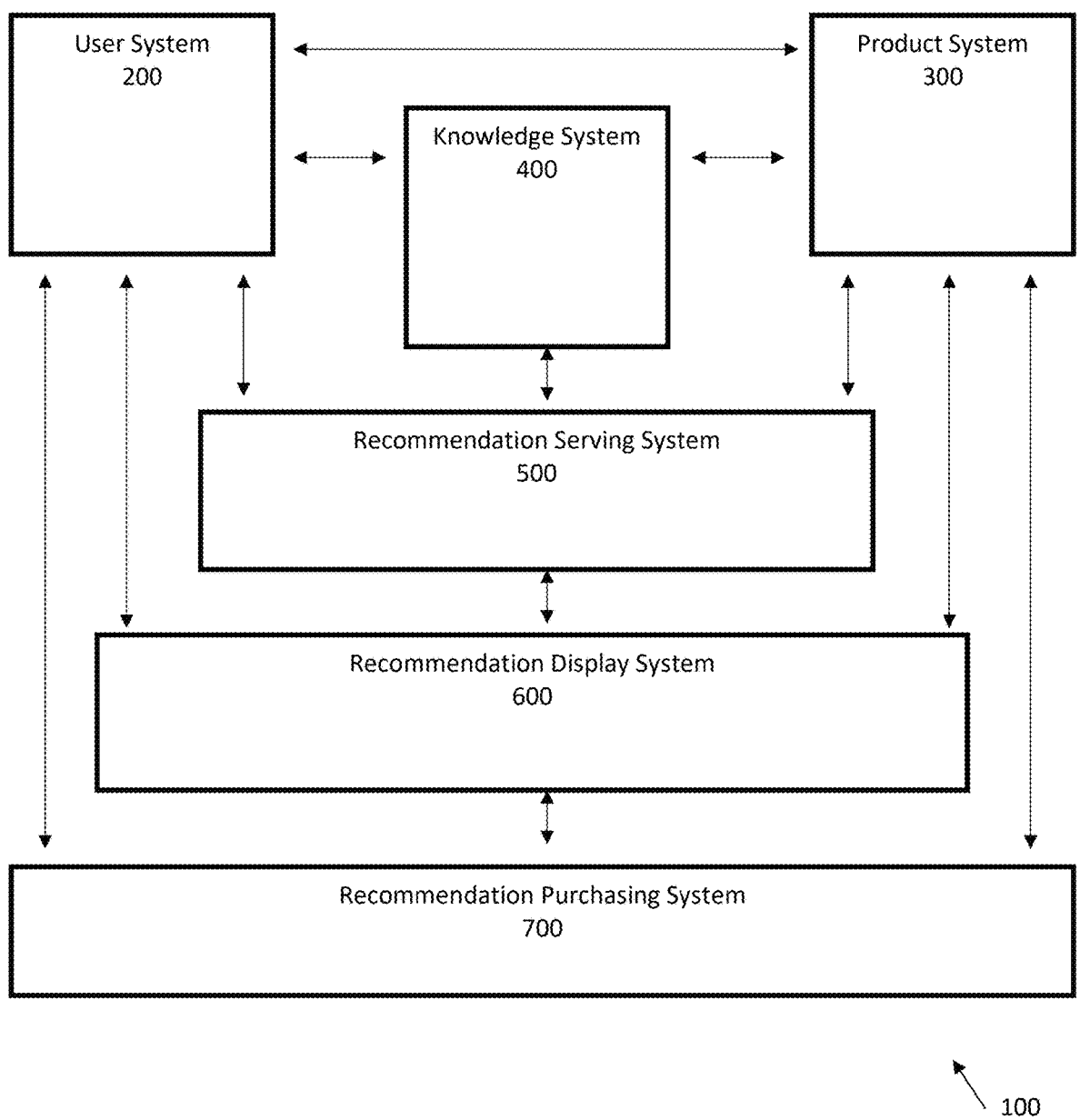
FIG. 1 illustrates a generalized system for providing product recommendations to a user which can be displayed and used as part of a product purchasing and fulfillment system

Before the present methods and systems are disclosed and described, it is to be understood that the methods and systems are not limited to specific methods, specific components, or to particular compositions, and as such may vary. It is also to be understood that the terminology used herein is for the purpose of describing particular embodiments only and is not intended to be limiting.

As used in the specification and the appended claims, the singular forms "a", "an" and "the" include plural referents unless the context clearly dictates otherwise.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises" means "including but not limited to" and is not intended to exclude, for example, other additives, components, integers, or steps. "Exemplary" means "an example of" and is not intended to convey an indication of a preferred or ideal embodiment. "Such as" is not used in a restrictive sense, but for explanatory purposes.

Use of words "frames" meaning either one frame or one still picture from a video or camera. "Frames" also is shorthand for "eyeglass frames". The context of the sentences should make clear which meaning is to be understood.

The term "expert" may encompass a range of expert-types who may provide an assessment of the suitability of a particular eyeglass for a particular face. Many different types of experts are possible. For example, primary experts who may develop suitability recommendation models may be opticians. However other types of experts are equally possible and contemplated. One such type of expert is an influencer or stylist. Likewise, friends or other acquainted with the user may be considered experts on that user's sense of suitability. Such experts may be knowledgeable in the product domain, in the user domain, in the social domain, in two such domains, or even in all three domains. Likewise, such experts may be knowledgeable in another domain where that expert's knowledge can be utilized to improve the quality of the product recommendation provided to the user. Accordingly, "expert" may refer to opticians, stylists, influencers, friends, etc.

The word style may take on multiple meanings in this document. In one sense style may refer to the fit of a frame to a particular face. This definition is incorporated in the phrase "suitability" or "suitability style." Do the frames physically mate well with the face. Suitability is partially objective, but may also be partially subjective according to the training, education, taste or style of the expert. In another sense, style may refer to the appearance or look and feel of a product without reference to a person's face or, indeed, it may be completely independent of a future user.

As used herein, a Landmark may be a point on a face, eyewear, or other object that has 2 or 3 coordinate components that represents its location in 2D or 3D space, respectively. Landmarks may indicate the locations of features of a face, eyewear, or other object, wherein such features are simply salient elements of the face, eyewear, or other object. By contrast, a feature, when referred to in relation to a database, extraction, a machine learning model, etc., may be an n-dimensional vector that includes n feature elements. Each element may be a floating point or integer number. Each element may describe the object of interest in a specific way. An attribute may be property and characteristic of an object from which features may be extracted or may be a priori for feature extraction.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The descriptions of these systems and methods include numerous lists of details and actions. It is understood that these may be used either solely or in any combination or grouping of these items.

In this description various computer hardware, interconnections, and data (raw and processed) coming from various systems or sub-systems are described. It is to be assumed than any data mentioned is accessible to any and all systems or sub-systems.

The following disclosure discusses the present invention with reference to the examples shown in the accompanying drawings, and illustrates examples of the invention though does not limit the invention to those examples.

The present invention relates to recommendation systems where the physical properties of the product and the user are relevant to the quality of the recommendation. In particular the present invention relates to an apparatus and method for developing a product recommendation for a user, where the method includes an evaluation of the physical properties of the product and the physical or anatomical properties of the user using computer vision, computer graphics, machine learning and statistical analysis and a knowledge-driven system of algorithms established through an offline, online or adaptive learning process to generate recommendations through a recommendation serving system. This apparatus and method may furthermore incorporate additional stylistic, social and usage properties of the product and the user when they are available. The present invention may be used to facilitate, as one example, an online recommendation of a product for a user and may be used to automatically enable the purchase of that recommended product by the user and the fulfillment of that recommended product to the user.

The present invention relates to a system and method for generating product recommendations for a user, along with the reasons for the recommendation, which can then be used as part of a product purchasing and fulfilment solution to deliver that product to the user. In particular, the present invention relates to a system and method of generating product recommendations where the user and product may not be physically present but where the physical properties of the product and user, along with the social properties of the product and the user, may impact the product recommendation, using computer vision, machine learning, Deep Learning and statistical analysis in conjunction with a knowledge-based system of observations and data, whether explicitly or implicitly defined.

Many systems and sub-systems will be described herein, and they may each act and draw upon the data and outputs of the other systems and sub-systems as necessary.

Overview

Embodiments may take into account user inputs (desires, styles, social milieu, called "social milieu data" or "social data" or "non-physical data") as well as measurements made on the user's face (physical data) to recommend various frames. Embodiments may allow the user to look at a picture on their personal (or other) device with their frame choice superimposed on their face. Embodiments may likewise function without added user input as well. The engine uses various methods to recommend possible frame choices along with the reasons they were selected. In embodiments, these frames may be displayed for the user to evaluate and may be superimposed on the image of their own face. This invention uses various image analysis methods such as facial feature extraction to create a digital record of a user's face. It then combines these features with the digital frame features. Based on input from human experts, weights are assigned to these various characteristics. Embodiments may utilize the pupillary distance (PD) for the lenses and the user's eyes is always of high importance (great weight), but perhaps a user cares less about the thickness of the frames and more about the size of the lenses. Embodiments may also take into account, if available, much more information about the user such as purchasing history, websites visited, and social media postings and interactions. The engine combines all this information and uses an algorithm to output various optimized options for frames (recommendations) along with some comments based on the categorizations of the frame-face interaction. These are the stylistic reasons for the recommendations.

This invention can be made available to users through a web browser on a user's personal device, which can be a smart phone, a tablet or laptop computer, a personal desktop computer, a smart watch, or a kiosk amongst other options obvious to those skilled in the art. The terms "personal device" or "personal user device" or "user device" or even "device" are used interchangeably below and are not intended to limit the choice of device.

An exemplary block diagram of a system 100 in which the present invention may be implemented is shown in FIG. 1. In this example, system 100 may include User System 200, Product System 300, Knowledge System 400, Recommendation Serving System 500, Recommendation Display System 600, and Recommendation Purchasing System 700.

User System 200

Figure 2:
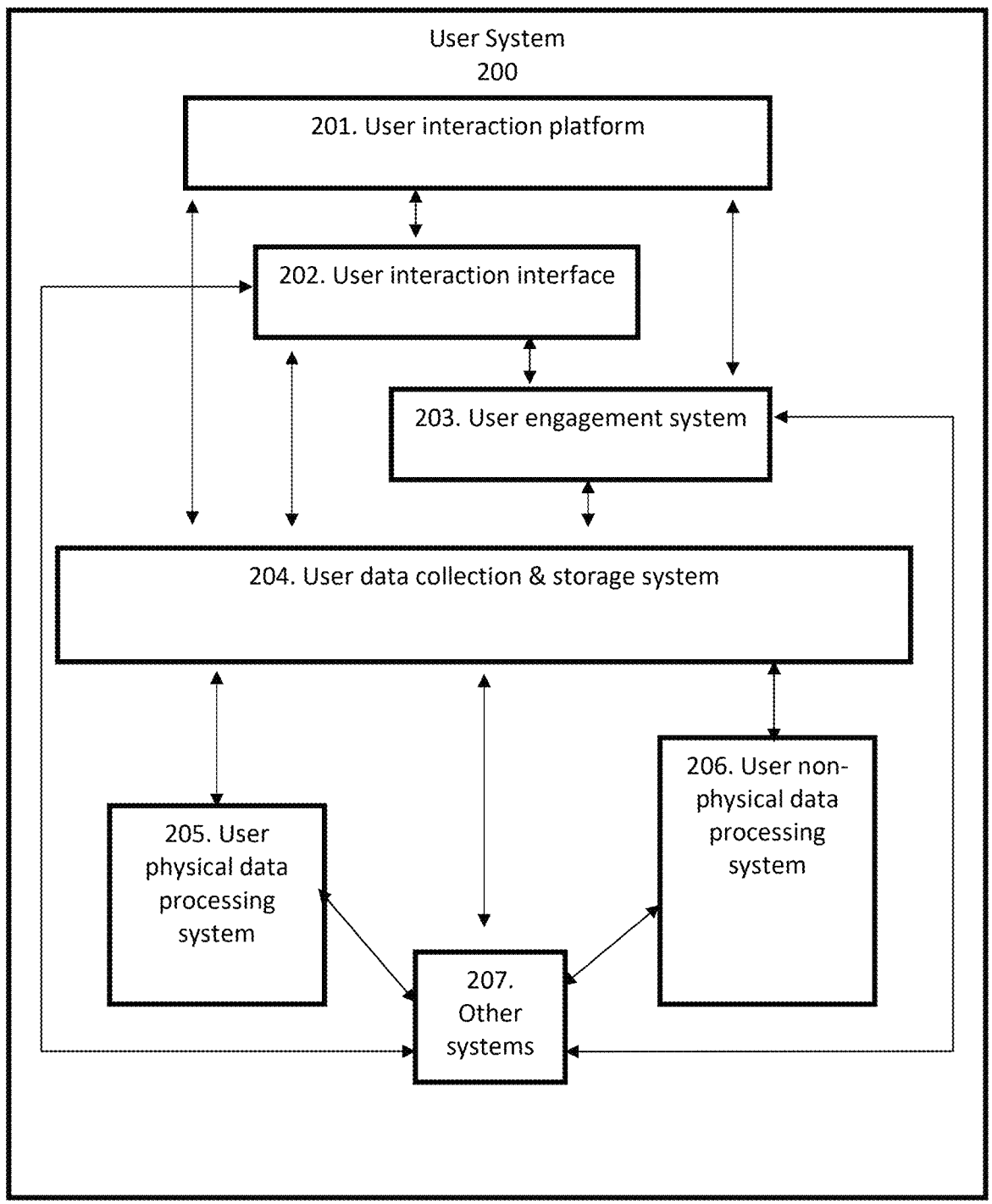
FIG. 2 illustrates a system (User System) for receiving, analyzing, and processing user data to be used within the process of FIG. 1.

An exemplary block diagram of a User System 200 is shown in FIG. 2. In this example, User System 200 includes user interaction platform 201, user interaction interface 202, user engagement system 203, user data collection & storage system 204, user physical data processing system 205, user non-physical data processing system 206, and other system 207. The user interaction platform 201 is used to access the user engagement system 203 through a user interaction interface 202. In one embodiment the user interaction platform 201 may include computing, electronic or personal electronic hardware. In one embodiment the user interaction platform 201 may also include an operating system that manages the memory, processes, and software on computing, electronic, or personal electronic hardware. The user interaction platform 201 may be used in connection with the user interaction interface 202, the user engagement system 203 or other systems 207, to create, cause to be created, allow to be created, access, cause to be accessed, allow to be accessed, modify, cause to be modified, allow to be modified, collect, cause to be collected, allow to be collected, transfer, cause to be transferred, allow to be transferred, store, cause to be stored, allow to be stored, process, cause to be processed, allow to be processed, user data. The user interaction platform 201 may also be used in conjunction with the Recommendation Serving System 500 Recommendation Display System 600, and Recommendation Purchasing System 700, as shown in FIG. 1.

Exemplary embodiments of user interaction platform 201 may include a personal electronic device, such as a mobile phone, a desktop or laptop computer, a software enabled watch, or any other personal device enabled to support a user interaction through a graphical interface, voice interface, or any other type of interface consistent with, or implied by the platform and/or containing sensors. In embodiments, user interaction platform may include a 3rd party electronic platform, such as a kiosk, a screen, or other device, which may be placed within a store, outside of a store, or in any other setting where a user may interact with it through a graphical interface, voice interface, or any other type of interface consistent with, or implied by the platform. In embodiments, user interaction platform 201 may include one or more cameras, which may be embedded within the device itself, may be able to control a depth camera, may be connected as a peripheral device, may be able to control one or more cameras directly or indirectly, that may or may not be connected as a peripheral device, through a user interaction interface, user engagement system or a separate system or any other electronic means, either directly or indirectly.

The user interaction interface 202 may be used to access the user engagement system 203 from the user interaction platform 201. The user interaction interface 202 may be used in connection with the user interaction platform 201, the user engagement system 203 or other systems 207 to create, cause to be created, allow to be created, access, cause to be accessed, allow to be accessed, modify, cause to be modified, allow to be modified, collect, cause to be collected, allow to be collected, transfer, cause to be transferred, allow to be transferred, store, cause to be stored, allow to be stored, process, cause to be processed, allow to be processed, user data. The user interaction interface 202 may also be used in conjunction with the Recommendation Display System 600 and Recommendation Purchasing System 700.

The user interaction interface 202 may consist of software, a graphical interface, a voice user interface, a kinetic interface, a sensory interface, a physical interface, or any other type of interface that allows or enables user interaction, whether it be passive or active. These may be used either solely or in combination with one another in accordance to their general principles. In embodiments, user interaction interface 202 may include a web interface, such as a mobile web interface or tablet web interface, an application, such as a mobile application, a tablet application, or a desktop application, or an application for another type of platform. In embodiments, user interaction interface 202 may be a text chat-based application, a voice-enabled application, an interface that combines digital and physical interactive interfaces, interfaces that support augmented reality or virtual reality, etc. In embodiments, user interaction interface 202 may include marketing events & campaigns, social platform interfaces, a human assisted interface, either in person, over the phone or via other digital means where the interaction occurs by voice, text or any other mechanism, or any interface implied by the user interaction platform upon which it is being used.

A user engagement system 203 is accessed from a user interaction interface 202. A user engagement system 203 may be used in connection with the user data collection and storage system 204, the user interaction interface 202, the user interaction platform 201 or other systems 207 to create, cause to be created, allow to be created, access, cause to be accessed, allow to be accessed, modify, cause to be modified, allow to be modified, collect, cause to be collected, allow to be collected, transfer, cause to be transferred, allow to be transferred, store, cause to be stored, allow to be stored, process, cause to be processed, allow to be processed, user data. The user engagement system 203 may also be used in conjunction with the Knowledge System 400, Recommendation Serving System 500, Recommendation Display System 600, and Recommendation Purchasing System 700.

A user data collection and storage system 204 is used in connection with the user engagement system 203, user interaction interface 202, the user interaction platform 201 or with any other systems, networks, applications, interfaces, or platforms 207 to access, collect or store data which may be used within the physical data processing system 205, or the non-physical data processing system 206, Knowledge System 400 or Recommendation Serving System 500.

The physical data processing system 205 and the non-physical data processing system 206 are used in connection with the user data and collection system 204, user interaction platform 201, user interaction interface 202, user engagement system 203, other systems, networks, applications, interfaces, or platforms 207, the Product System 300, the Knowledge System 400, and Recommendation Serving System 500. In embodiments, physical data processing system 205 and non-physical data processing system 206 may include processes, sub-processes, algorithms, models commands, modifications, or calculations. Such information may be stored on the physical processing system 205 and the non-physical data processing system 206, or may be served by the physical data processing system 205 and the non-physical data processing system 206 but stored in the Knowledge System 400.

Product System 300

Figure 3:
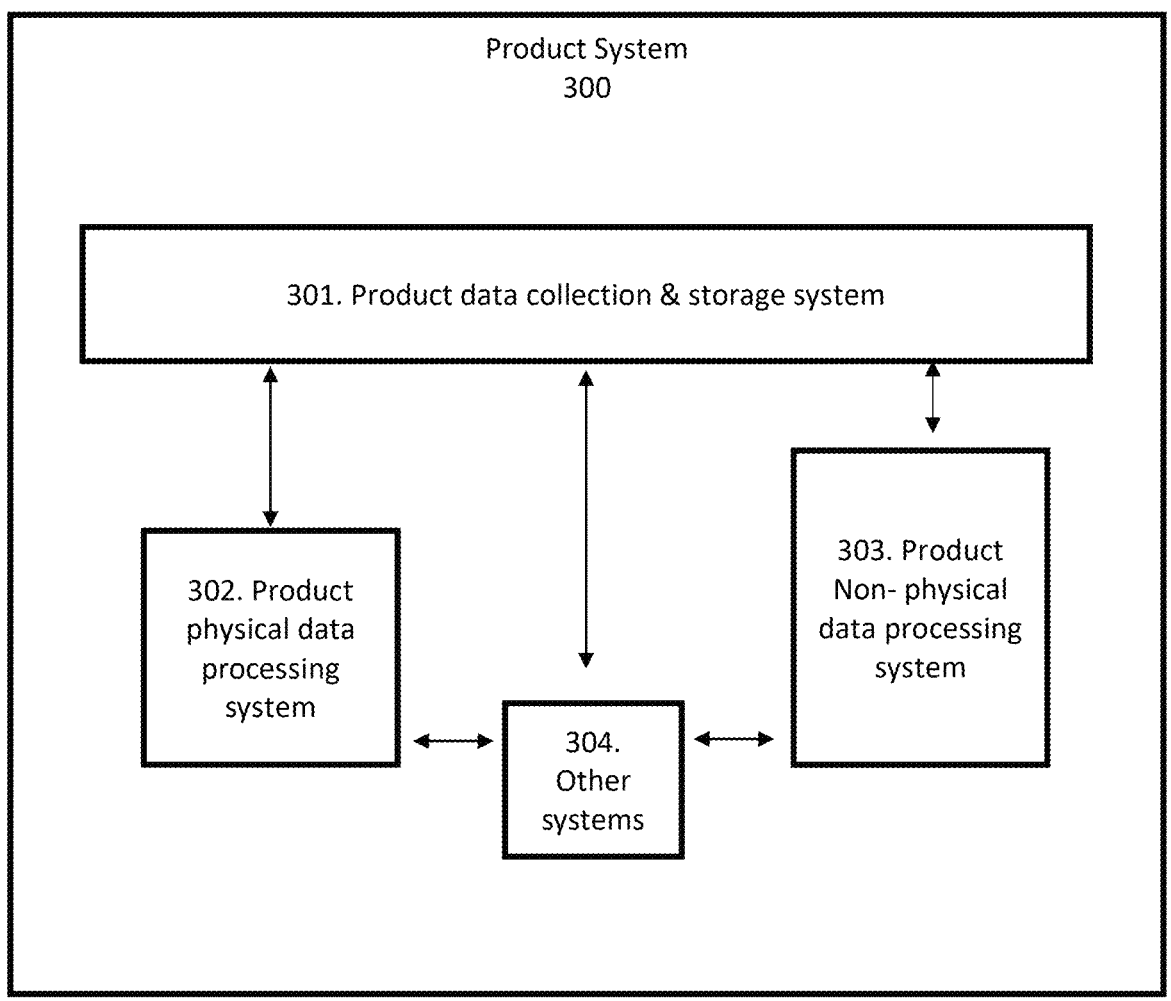
FIG. 3 illustrates a system (Product System) for receiving, analyzing, and processing product data to be used within the process of FIG. 1.

An exemplary block diagram of Product System 300, for collecting, storing, receiving, analyzing, and processing product data to be used within the process of FIG. 1, is shown in FIG. 3. The system 300 includes a product data collection and storage system 301, a product physical data processing system 302, a product non-physical data processing system 303, and other systems 304. A product data collection and storage system 301 is used in connection with the product physical data processing system 302, the product non-physical data processing system 303 and other product systems 304. The product data collection and storage system 301 may also be used by elements of the User System 200. The product data collection and storage system 301 may also be used by elements of the Knowledge System 400. The product data collection and storage system 301 may also be used by elements of the Recommendation Serving System 500. The product data collection and storage system 301 may also be used by elements of the Recommendation Display System 600. The product data collection and storage system 301 may also be used by elements of the Recommendation Purchasing System 700.

Knowledge System 400

Figure 4:
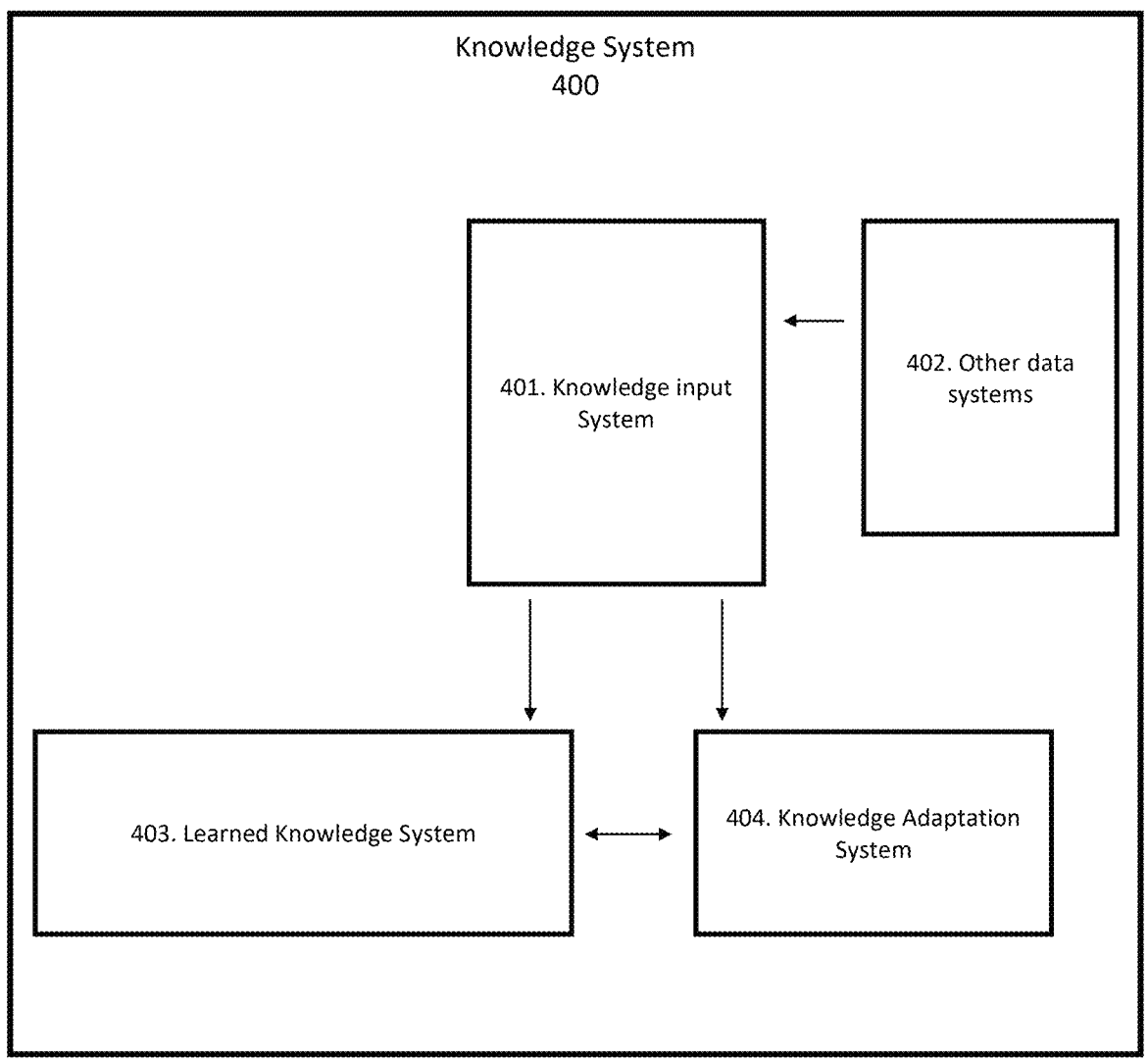
FIG. 4 illustrates a system (Knowledge System) for developing, adapting, and storing knowledge, to be used within the process of FIG. 1.

An exemplary block diagram of Knowledge System 400, for storing and updating knowledge used within the process of FIG. 1, is shown in FIG. 4. The system 400 includes a Knowledge input system 401, other data systems 402, a learned knowledge system 403, and a knowledge adaptation system 404. A knowledge input database 401 may be used in connection with the User System 200, the Product System 300, the Recommendation Serving System 500, Other Data Systems 402, the Learned Knowledge System 403, and the Knowledge Adaptation System 404. One embodiment of a knowledge input system 401 is a database or set of databases stored on computing hardware. This hardware could take the form of desktop hardware or servers. Another embodiment of a knowledge input system 401 is a database or set of databases stored on cloud servers. Another embodiment of a knowledge input system 401 is a web server. Another embodiment of a knowledge input system 401 is a 3rd party database of content that is accessible or made to be accessible. Another embodiment of a knowledge input system 401 is any other type of memory, storage system or storage location where various types of data may be temporarily or permanently stored, including, but not limited to cache memory, primary memory, secondary persistent or ephemeral memory, browser cache, disk, Redis, bucket, a container, user system, client system or server system memory. The various embodiments of a knowledge input system 401 may be used either solely or in combination with one another in accordance with their general principles.

Recommendation Serving System 500

Figure 5:
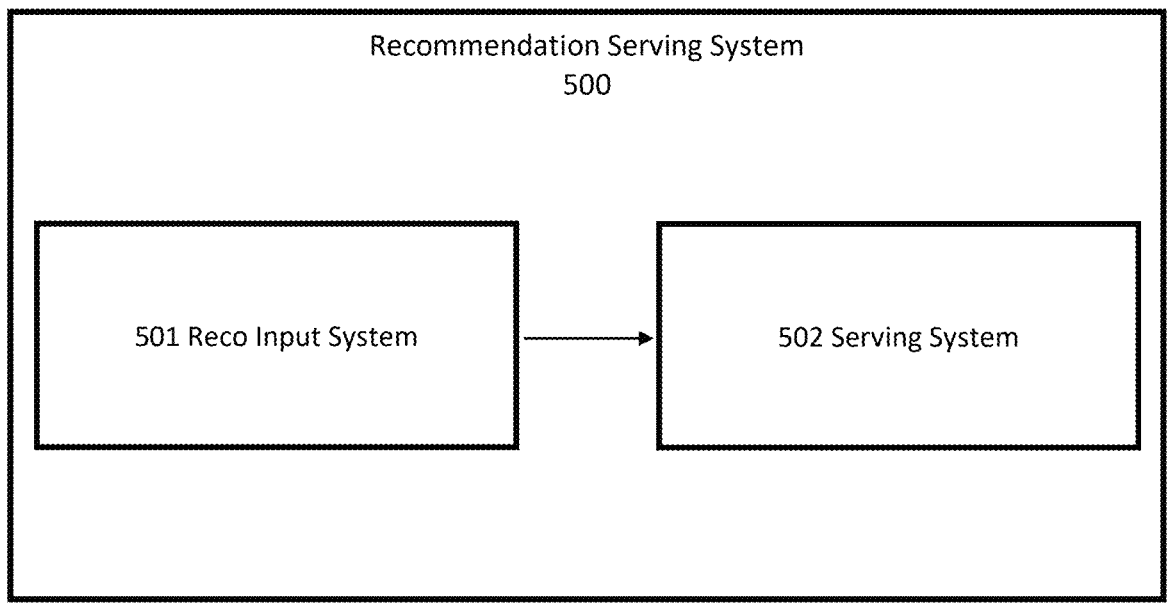
FIG. 5 illustrates a system (Recommendation Serving System) for developing recommendations to be used within the process of FIG. 1.

An exemplary block diagram of Recommendation Serving System 500, for generating recommendations for a user to be used within the process of FIG. 1, is shown in FIG. 5. The system 500 includes a reco input system 501 and a serving system 502. The Recommendation Serving System is connected to the User System 200, the Product System 300, the Knowledge System 400, and the Reco Display System 600. The reco input system 501 is a system that receives data from the User System 200 and the Product System 300 and further processes it to be used by the serving system 502. The reco input system 501 may also receive models, algorithms, or calculations from the Knowledge System 400 to be served or performed. One embodiment of a reco input system 501 is a database or set of databases stored on computing hardware. This hardware could take the form of desktop hardware or servers. Another embodiment of a reco input system 501 is a database or set of databases stored on cloud servers. Another embodiment of a reco input system 501 is a web server. Another embodiment of a reco input system 501 is a 3rd party database of content that is accessible or made to be accessible. Another embodiment of a reco input system 501 is any other type of memory, storage system or storage location where various types of data may be temporarily or permanently stored, including, but not limited to cache memory, primary memory, secondary persistent or ephemeral memory, browser cache, disk, Redis, bucket, a container, user system, client system or server system memory. The various embodiments of a reco input system 501 may be used either solely or in combination with one another in accordance with their general principles.

Recommendation Display System 600

Figure 6:
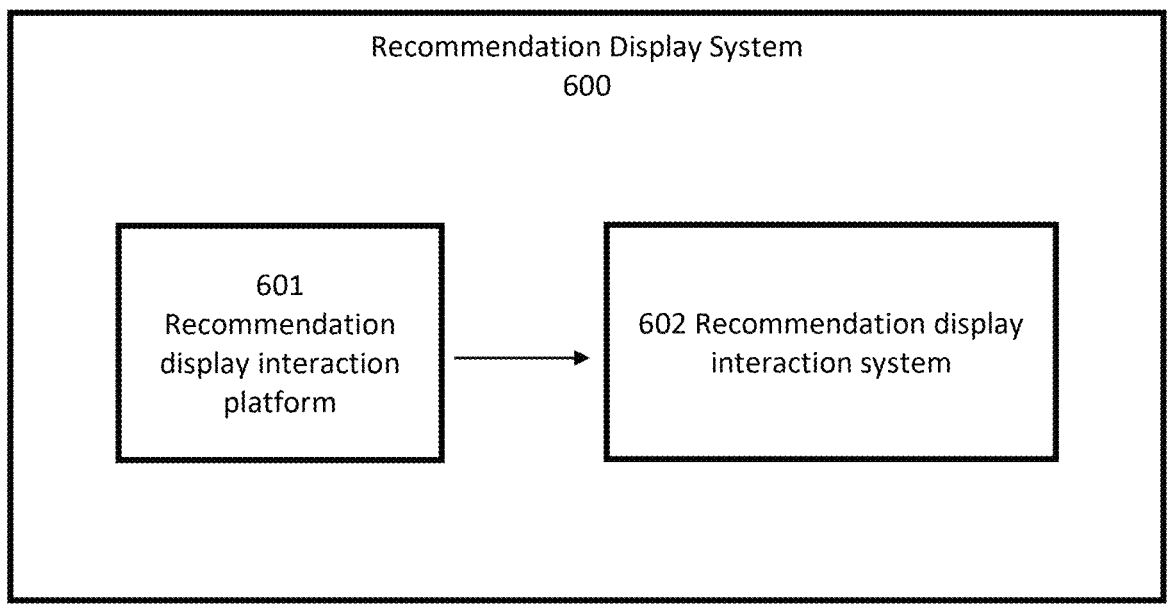
FIG. 6 illustrates a system (Recommendation Display System) for displaying product recommendations to a user to be used within the process of FIG. 1.

An exemplary block diagram of Recommendation Display System 600, for displaying recommendations to be used within the process of FIG. 1, is shown in FIG. 6. The system 600 includes a recommendation display user interaction platform 601 and a recommendation display user interaction interface 602. The recommendation display user interaction platform 601 may be used in connection with the User System 200 and the recommendation display user interaction system 602. One embodiment of a recommendation display user interaction platform is a personal electronic device. An exemplary personal electronic device is a mobile phone. Another exemplary personal electronic device is a desktop or laptop computer. Another exemplary personal electronic device is a software enabled watch. Another exemplary personal electronic device is any other personal device enabled to support a user interaction through a graphical interface, voice interface, or any other type of interface consistent with, or implied by the platform.

Recommendation Purchasing System 700

Figure 7:
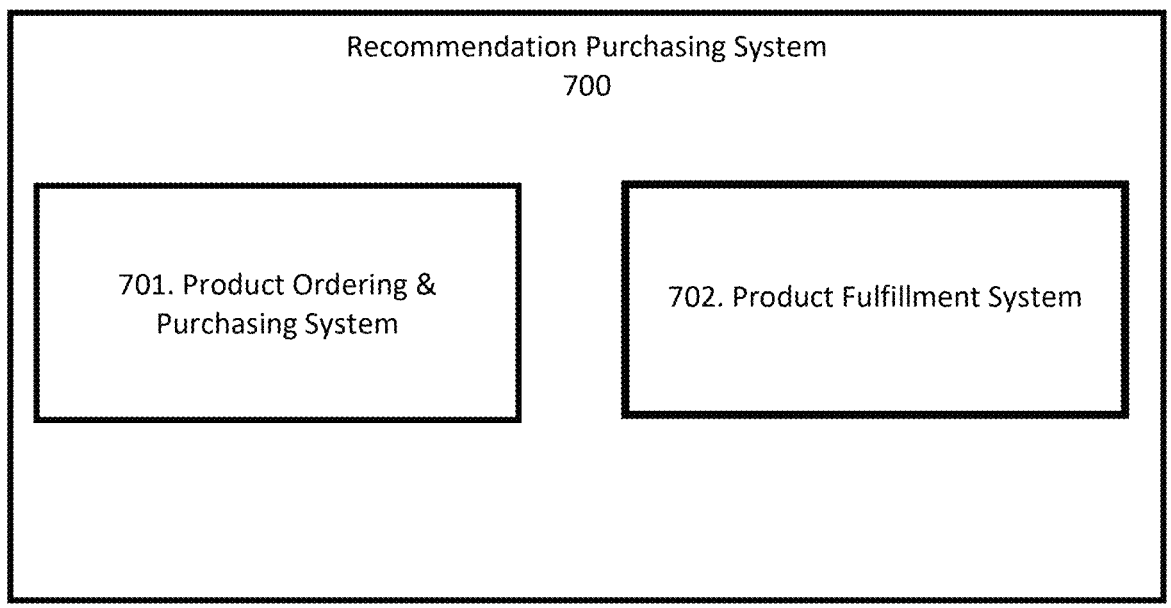
FIG. 7 illustrates a system (Recommendation Purchasing System 700) for enabling the ordering, purchase, and fulfillment of recommended products to a user to be used within the process of FIG. 1.

An exemplary block diagram of Recommendation Purchasing System 700, for enabling the purchase of recommended product to be used within the process of FIG. 1, is shown in FIG. 7. The system 700 includes a product ordering and purchasing system 701 and a product fulfillment system 702 and is used in connection with the Recommendation Display System 600 and may be used with the User System 200, the Product System 300, and the Recommendation Serving System 500. In one exemplary embodiment the product ordering and purchasing system 701 may be an online store. In another embodiment the product ordering and purchasing system 701 may be an online platform that enables product ordering and purchasing. An example of an online platform that enables product ordering and purchasing includes Google Shopping. Another example of an online platform that enables product ordering and purchasing includes Facebook and Instagram. In another embodiment the product ordering and purchasing system 701 may be an online advertising network. In another embodiment the product ordering and purchasing system 701 may be an online affiliate network. In one embodiment the product ordering and purchasing system may be an influencer, an influencer's social platform, an influencer network platform, or some other platform that allows users to purchase from influencers. In one embodiment the product ordering and purchasing system 701 may be a physical store. In another embodiment the product ordering and purchasing system 701 may be a digital interface related to a physical store. In another embodiment the product ordering and purchasing system 701 may be a kiosk. In another embodiment the product ordering and purchasing system 701 may be a call center.

Figure 8:
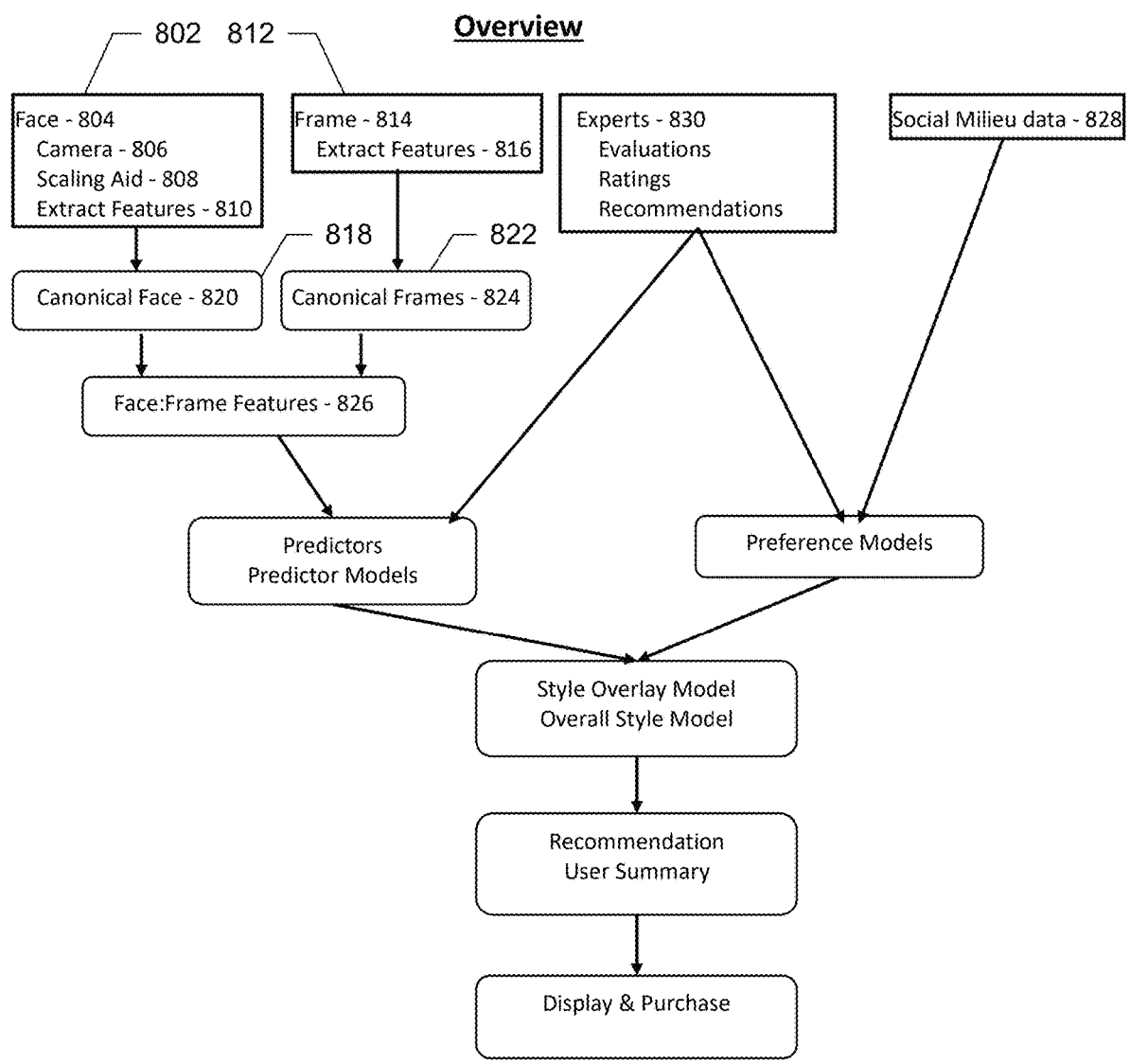
FIG. 8 illustrates an overview of steps implemented in the process of FIG. 1.

An overview of this invention is shown in FIG. 8. At 802, a user may employ a device, such as a smart phone, tablet, laptop, etc., to capture photographic images of the user's face 804. In embodiments, a scaling aid 808 may be used to establish a scale of the user's facial features, which may be extracted from the images at 810. At 812, one or more frames 814 may be selected, and features of the frames may be extracted 816. At 818, a mathematical transformation may be used to create and render a canonical face 820. At 822, we directly render the 3D designs of the frames to the canonical space to create canonical frames 824. These digital/canonical faces 820 may be combined with digital/canonical eyeglass frames 824 (or other items) to create a canonical face: frame combination 826, which may be in both image space and in a sparse point distribution model. In addition the user's social milieu (e.g. social, demographic, interests, etc.) data 828 may also be processed in an affinity model to identify those experts 830 for whose style the user has a preference. The stylist's rankings of various face: frame combinations and features may be used to create a computer model for identifying those features of the face: frame combinations which are suitable. In situations in which the expert is a stylist/optician, the expert may rank of various face: frame combinations and features, this is correct. However, experts do not need to be opticians and stylists don't need to have special expertise. For example, where the expert is a stylist, but not an optician, they would still follow this same approach. However, where the stylist is an influencer, the stylist's style preferences unrelated to the user may be used, through a Personal Product Affinity Model and then apply those style preferences to the user if that user has indicated a preference for that stylists' style. Then a suitability recommendation models may be applied to the user's canonical face: frame combination to identify those combinations of frames with the user's face which are the most highly recommended. These are recommended to the user where they are displayed and the user may purchase them.

Data Collection and Storage

The system may collect and store user data via various engagement or interactive interfaces and platforms. Some of the sub-systems for storing or processing data may include a physical data processing system, a social milieu data processing system, a Knowledge System for training or serving models, a recommendation system, and a purchasing system.

One embodiment of a user data collection and storage system is a database or set of databases stored on computing hardware. This hardware could optionally take the form of desktop hardware or servers. Another embodiment of a user data collection and storage system is a database or set of databases stored on cloud servers. Another embodiment of a user data collection and storage system is any other type of memory, storage system or storage location where various types of data may be temporarily or permanently stored, including, but not limited to cache memory, primary memory, secondary persistent or ephemeral memory, browser cache, disk, Redis, bucket, a container, user system, client system or server system memory.

The data collected and stored within the user data collection and storage system may be collected from other systems through direct access to those systems, or through any computer services or inter-process communications (IPC) such as shared memory and message passing, remote procedure calls (RPC), or through any other means that allow the data to be transferred and collected from those systems.

Various types of data may be stored. These data include, but are not limited to, several examples. One exemplary type of data stored in the user data collection and storage system is user data such as IP address, session ID, customer ID, customer login data, and past engagement data for one or more user interaction interfaces or user engagement systems. Another exemplary type of data stored is user interaction platform or device data such as hardware information, operating system information, software information, application information, camera information and other device or platform data. Other device data may optionally include user generated device data such as gyroscope data or inertia measurement unit data and others. For example, gyroscope data, which is available in many cell phone nowadays, may help to estimate the PD more accurately because using a reliable pose of the head. Another exemplary type of data that may be stored is user interaction interface data, such as software information, application information.

Another exemplary type of data stored is user data created directly by or through user engagement with the user interaction interface or with the user interaction platform. In one embodiment this user data are individual images, a set of images, or a stream of images or video transmitted to a user system. This user data may also optionally have been accessed or collected through other systems, networks, applications, interfaces, or platforms. Exemplary user data may include user images, user videos, user recordings, user interactions, user interaction outputs, user engagements, user engagement outputs or other user content. Other exemplary user data may include other user content including actions, posts, connections, and others.

The individual images, set of images, or stream of images or video transmitted to the user system through the user's may be stored by the user data collection and storage system. These images may include images of the user's face positioned in relation to the camera in one or more ways. These images may include images of the user's face along with a scaling aid, such as a standard sized plastic card, or any other planar rectangular object of known dimensions, or including indicia of known dimensions, positioned relative to their face and relative to the camera in one or more ways. The planar rectangular object and/or indicia may be detected and localized at any location in the images, and may be used to establish a scale of the images. These images may include both an image or set of images, or stream of images or video of the user's face positioned in relation to the camera in one or more ways, as well as an image or set of images, or stream of images or video of the user's face along with a scaling aid, such as a standard sized plastic card, positioned relative to their face and relative to the camera in one or more ways.

The user data stored by the user data collection and storage system may include user preference data, user demographic data, user pupillary distance measurement, user past purchasing history, user past social activity, social connections, social engagement and social data, user personality data, user stylist preference data, user online activity or browsing history data, or any other data captured by the User System.

The physical data processing system and the social milieu data processing system are used in connection within the user system, but may also be accessed by the other systems and sub-systems of this invention.

The data processing systems may be a set of processes, sub-processes, algorithms, models commands, modifications or calculations stored in computer hardware or storage locations within the User System but they may also be stored in the Knowledge System. These processes, sub-processes, algorithms, models, modifications, and calculations may reside physically remote from the user interface, for instance on cloud servers, or they may reside in the same device from the user interface.

The physical data processing system and the social milieu data processing system may access the data within the user data and collection system or within other systems through direct access to those systems, through any computer services or inter-process communications (IPC) such as shared memory and message passing, remote procedure calls (RPC), or through any other means that allow the physical data processing system and the social milieu data processing system to serve the processes, sub-processes, algorithms, commands, modifications or calculations on the data stored in the user data and collection system or within other systems. Similar communications may be permitted amongst the various systems and sub-systems such as with the Knowledge System, the Recommendation Serving System, and the others, as necessary.

User Interface Access

Figure 9:
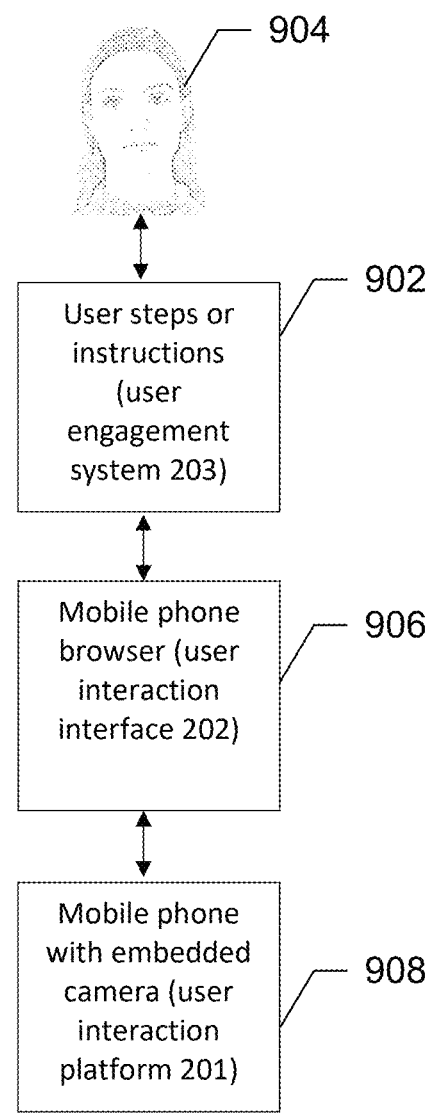
FIG. 9 illustrates a user receiving a set of instructions delivered to a user via a browser, or other user interaction interface 202 on a personal electronic device, such as a mobile device, to access the user interaction platform 201 hardware or software

An exemplary flow diagram of User Interface Access is shown in FIG. 9. In this example, at 902, a user 904 may receive a set of instructions from user engagement system 203. At 906, these instructions may be delivered via a browser, or other user interaction interface 202 on a personal electronic device, such as a mobile device, to, at 908, access the user interaction platform 201 hardware and software. For example, a use may look at their own image in a screen with a camera with the head centered in an oval and a plastic card (scaling aid) located in its own rendered frame.

The user has the device take a photograph or several photos, preferably with an object of known dimensions like a credit card in the field of view of at least one of the photographs. A single photograph may be taken. Multiple photos may be taken. In embodiments, the user may be instructed to take two or more photos of their face in different poses, or possibly a video of them holding their face in different poses. The system will use image processing methods and facial recognition techniques to identify facial landmarks or features as well as the reference length. It will then identify various facial features through the Face Feature Extractor. It will also identify the scaling aid (a reference object of known length) so that proper lengths may be assigned to the various features. If no scaling aid was used or available, then the pupillary distance (PD) will be entered from the user's prescription (or some other source) and that will be used instead to assign lengths in the photograph. (to calculate the pixel width of the photo or to assign a width per pixel in the photo) In the rare case when the PD is unknown, special cameras can compensate and measure lengths of known objects without reference to any scaling aid. Varying the focus, the depth of field, the depth of focus, or the pose or the angle of the camera or using various cameras (e.g. RGB-Depth or RGB-D cameras)—at the same time from different viewpoints are all encompassed by this disclosure in the words "images were captured by a camera" or similar phrases.

Such devices may contain one or more cameras which are embedded within the device itself. The camera(s) may be able to control depth of focus or to vary the depth of focus to aid in creation of three dimensional images. Such devices may also be able to control one or more cameras that may be connected as a peripheral device or to otherwise control one or more cameras directly or indirectly, by any electronic means.

Creating a Digital Face

In embodiments, a Learned Knowledge System may serve to train various models including, for example a Face Detector model, a Head Pose Estimator model, a Face Image Attribute Model, a Face Landmark Detector Model. These models may include a variety of techniques including, for face detection, a SSD [single shot object detection] Mobilenet based network architecture over a database of faces, such as the Widerface dataset, 300 W dataset, [Intelligent Behavior Understanding Group version from Imperial College London] CelebA dataset, LFW dataset [Labelled Faces in the Wild, maintained by UMass-Amherst] or any other dataset of faces. Data sets generated internally to a firm may also be used to train these models.

The physical data processing system may receive images from the user data collection and storage system. In embodiments, the images received may include an image of the user with the use of a scaling aid in the image to aid in determining pupillary distance (PD). In embodiments in which the images do not include a scaling aid, then the pupillary distance (PD) between the user's pupils may be obtained from other measurements, such as the user's prescription, or entered by the user directly. In this latter case, the PD will be used instead of the scaling aid to assign lengths within the photograph. Other known distances may also be used as a scaling aid, such as distance between two facial features. The physical data processing system processes the images using a Face Detector to detect faces within the images. One embodiment of a Face Detector used within system may be a face detection model trained within the Learned Knowledge System using a SSD Mobilenet [single shot detection or single shot object detection] based network architecture. If no face is detected within any image, system communicates the result of the process to the user engagement system so that the user engagement system can communicate appropriate instructions to the user so the user can modify their engagement with the user engagement system to meet the requirement of system. If a face is detected in one or more images, system further processes these images in which a face has been detected to estimate the pose of the face in each image.

Figure 10:
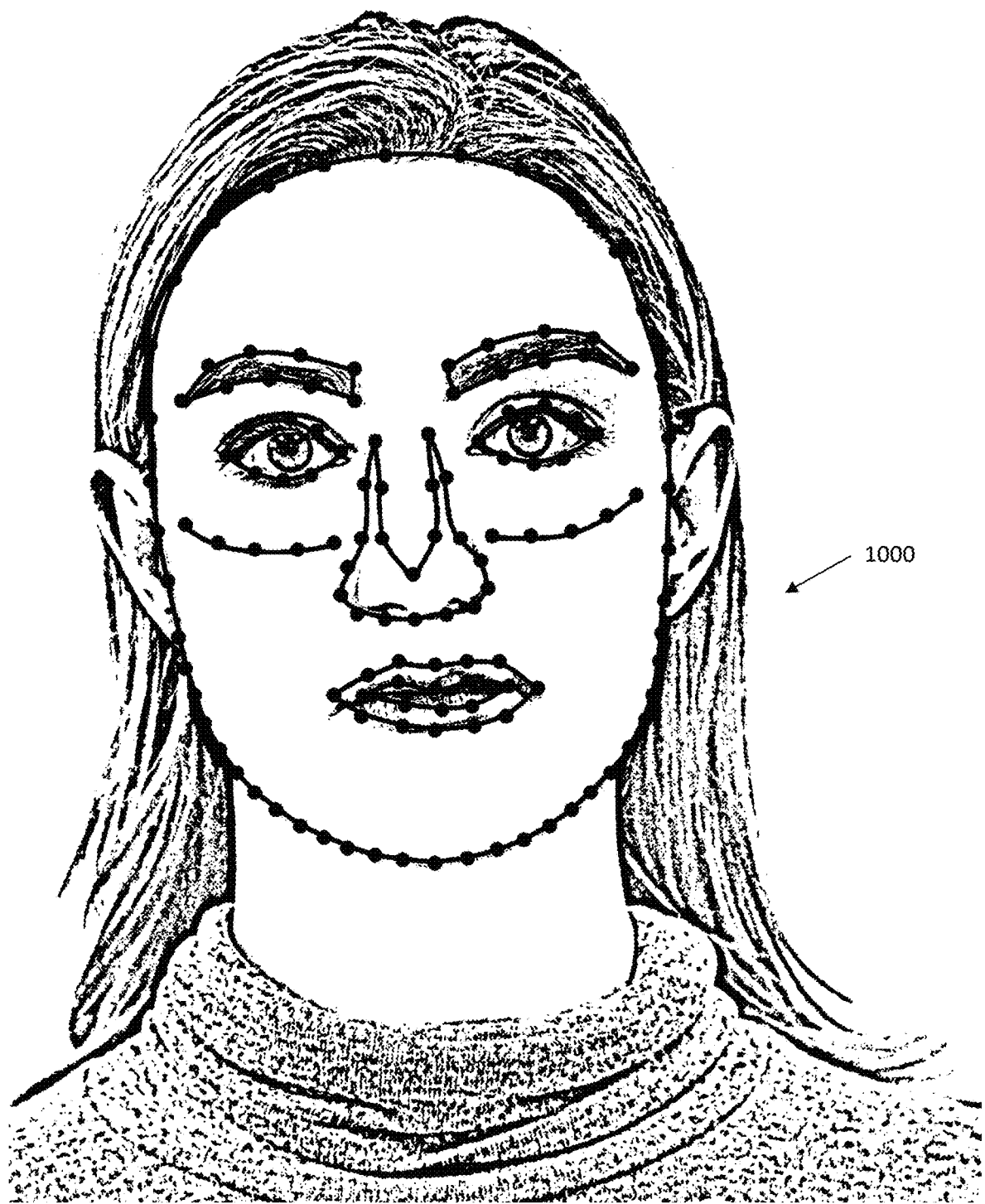
FIG. 10 illustrates Face Landmarks
Figure 11:
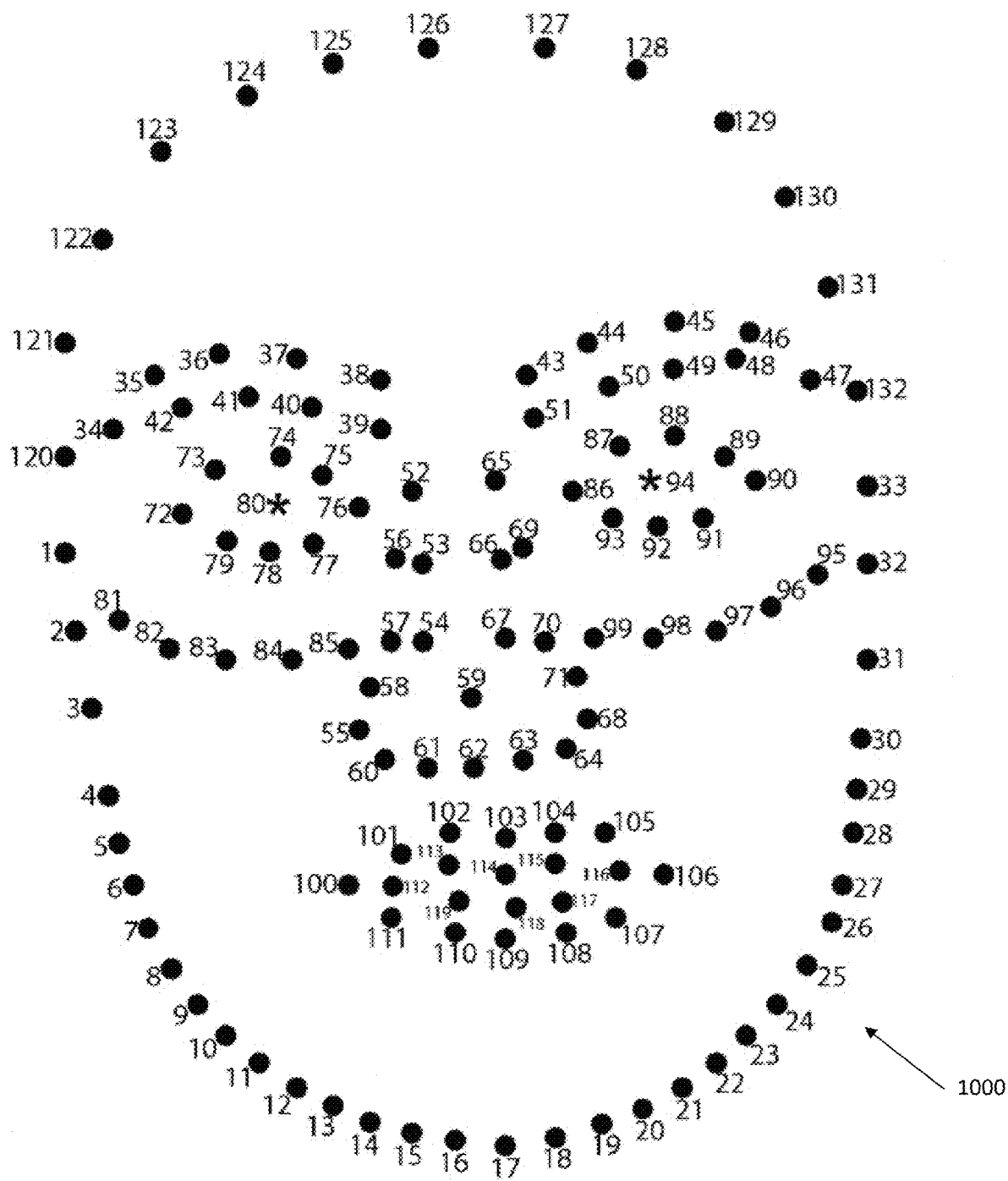
FIG. 11 illustrates Face Landmarks

One embodiment of a head pose estimator used within system is a Head Pose Estimator model trained within the Learned Knowledge System using a FSA-Net architecture [Fine-grained Structure Aggregation] and using fine-grained structure mapping. A smart image selector may utilize a Face Image Attribute Model trained within the Learned Knowledge System to identify and estimate key face attributes within an image such as whether or not the eyes on the face are open in order to identify the image or set of images that best meet the image requirements for additional data processing and analysis within the User System, Knowledge System or Recommendation Serving System. The Face Image Attribute Model is also used to extract other attributes such as gender, emotions and whether the user is wearing glasses or not. The image requirements for additional data processing and analysis include the eyes on the detected face being open. The input requirements for additional data processing and analysis include that the estimated head pose be within a certain threshold. For example, the threshold for the estimated X axis: −10° to +10°, Y axis: −10° to +10°, Z axis: −15° to +15° around the X, Y and Z axes. The image with the estimated head pose closest to 0°×0°×0° where the eyes are also open is selected by the smart image selector. If none of the images are selected by the smart image selector then system communicates the result of the process to the user engagement system so that the user engagement system can communicate appropriate instructions to the user so the user can modify their engagement with the user engagement system to meet the image requirements. A Face Landmark Detector may be used to extract customized face landmarks from the image or images selected by the smart image selector. A Face Landmark Detector used within system may be a model trained within the Learned Knowledge System using a PFLD architecture. [Practical Facial Landmark Detector] The face landmarks 1000 extracted by the Face Landmark Detector are illustrated in FIGS. 10 and 11. These face landmarks are used within the various systems and subsystems, as required.

A Head Pose Estimator model may be a head pose estimator model trained using a FSA-Net [Fine-grained Structure Aggregation] architecture and using fine-grained structure mapping over a database of faces such as the Widerface dataset, 300 W dataset or any other dataset of faces. A Face Image Attribute Model may be a model trained using a convolutional neural network (CNN), such as VGG16 [Visual Geometry Group at Oxford, version 16 of their algorithm] over a database of faces such as ones mentioned previously (Widerface and 300 W) or any others Some attributes may include whether the eyes are open or closed, the user's gender, emotions and whether the user is wearing glasses or not. A Face Landmark Detector Model. may be trained using a PFLD architecture over a database of faces such as the Widerface dataset, the 300 W dataset or any other dataset of faces annotated with customized landmarks relevant to the fit of a frame on a face. Some face landmarks 1000 identified by the Face Landmark Detector are illustrated in FIGS. 10 and 11.

Scaling Aid

While taking a photo of the user's face, the image may incorporate a scaling aid. One such aid includes the use of a scaling aid, such as a standard sized plastic card, like a credit card, or other object of a standard size for use as a reference length or calibration length standard or scaling aid (all of which are considered synonyms). The user engagement system may also provide instructions that are responsive and adaptive to the user's actions.

The user engagement system provides the user with instructions to position their face in relation to the camera in one or more ways, either in individual steps, a series of individual steps or in a continuous series of steps. These instructions may include instructing the user to use a scaling aid, such as a standard sized plastic card, positioned relative to their face and relative to the camera in one or more ways. The user engagement system may provide the user with instructions to position their face relative to the camera by overlaying a graphical design, such as an oval, on the screen of the interaction platform or interaction interface used by the user and asking the user to place their face within the oval. This graphical design may include other elements that provide direction to the user on how to position their face relative to the camera, as well as the use and placement of a scaling aid. The user may be requested to place the scaling aid within a certain section of the photo, as outlined by a frame indicating the proper location and orientation for the scaling aid in the photo overall and also relative to the user's face.

The Learned Knowledge System or the physical data processing system may be used to train a Perspectivity Invariant Card Boundary Detector or a Perspectivity Invariant Card Segmenter using, for instance, a U-Net based architecture or a PFLD architecture, in conjunction with a bounding box detector, such as YOLOv3 [You Only Look Once version 3, a software package used to identify objects in a photo/image] over a dataset of face images that contain an image of a face with a standard sized plastic card, such as a credit card. The latter may use, for example, a U-Net based segmentation model over a dataset of face images that contain an image of a face with a standard sized plastic card, such as a credit card. After the card boundary in the image is detected by the perspectivity invariant card boundary detector, or after the pixels representing the card in the image have been detected by a perspectivity invariant card segmenter, a Card Localizer algorithm may be utilized to identify more precisely the card corners. The Card Localizer may fit a polygon model on the data. In another embodiment the Card Localizer may utilize one or more of random sample consensus (RANSAC) based algorithms or other processes.

If an external scaling aid has been used, the width of the scaling aid in pixels, in one or more images may be calculated and compared to the prior knowledge of the actual, real-world, measurements of the scaling aid to establish a pixel to millimeter ratio of the scaling aid in the image or set of images. This pixel to millimeter ratio of the scaling aid is used to translate a pixel width measurement of a defined anatomical feature of the user in the image or set of images containing the scaling aid, such as a pupillary distance, into a millimeter or other measurement.

A defined anatomical feature of the user may be used as a scaling aid of no external scaling aid is present in the picture. The measurement of the defined anatomical feature may be added separately into the data and this measurement will function as the scaling aid in place of an external scaling aid. A commonly calculated millimeter measurement of a defined anatomical feature of the user may be the pupillary distance, which is the millimeter distance between face landmark #80 and #94 as shown in Table 1. This anatomical feature measurement may be used to normalize the image or set of images of the user into a canonical space.

If no scaling aid has been used but a special camera has been used, such as a depth camera, an RGB-D camera, a stereo camera, or 3D camera, these cameras may be used to estimate a measurement of a defined anatomical feature of the user in the image or set of images in place of a scaling aid.

In a further embodiment deep learning models may be used to estimate a measurement of a defined anatomical feature of the user in the image or set of images, such as pupillary distance which can then be used to normalize the facial images selected by the smart image selector into a canonical space.

Extract Facial Features

TABLE 1

Hand engineered face features calculated by
the Canonical Face Feature Extractor

| Feature type | Feature name | Feature description |
| --- | --- | --- |
| Fit & Size | face width | distance between face landmark #1 and face landmark #33 |
| Fit & Size | face height | distance between face landmark #17 and face landmark #126 |
| Fit & Size | top nose width | distance between average of face landmark #52, face landmark #53, face landmark #56 and average of face landmark #65, face landmark #66, face landmark #69 |
| Fit & Size | brow to nose distance | distance between face landmark #59 and average of face landmark #34 to face landmark #38 and face landmark #43 to face landmark #47 |
| Fit & Size | PD (pupillary distance) | distance between face landmark #80 and face landmark #94 |
| Shape | Face shape | interpolated points on the curve resulted from joining contour landmarks (#1-#33 to #132-#120) of the face |
| Shape | Brow line shape | interpolated points on the curve resulted from joining eyebrow landmarks (#34-#38 to #43-#47) of the face |
| Shape | Bridge shape | interpolated points on the curve resulted from joining eyebrow landmarks (#34-#38 to #43-#47), eye landmarks (#72-#79 to #86-#93) and nose landmarks (#52-#69) of the face |
| Color | Hue | Vector of top 5 hues sorted from most dominant to least dominant for region around each face landmark |

TABLE 1-continued

Hand engineered face features calculated by
the Canonical Face Feature Extractor

| Feature type | Feature name | Feature description |
| --- | --- | --- |
| Color | Saturation | Vector of top 5 saturations sorted from most dominant to least dominant for region around each face landmark |

All features are measured in millimeters.

In the art, a hand engineered feature may mean that a human defines every element of the feature vector. However, in many applications, it may be preferable to automate this process of feature selection. For example, most of the deep learning models such as CNN may produce a feature set automatically without human intervention.

Even without a scaling aid, the Canonical Face Feature Extractor may still extract features. The scaling aid may help create the canonical space into which features may be extracted. If there is no scaling aid, a canonical space may still be created. For instance, a canonical space may be created by estimating the age, gender, race, and other demographic parameters of the person from the image using a CNN and then looking up the average PD and other anthropometric data from a database. Using that we can create the canonical space. Also, a default PD may be used if the scaling aid is not available.

Canonical space is a mathematical space that is based on certain fixed parameters that generate the space, so comparisons can be made and the rest of the processing may be performed in that space. Canonical space may be considered a standard unique space.

Figure 12:
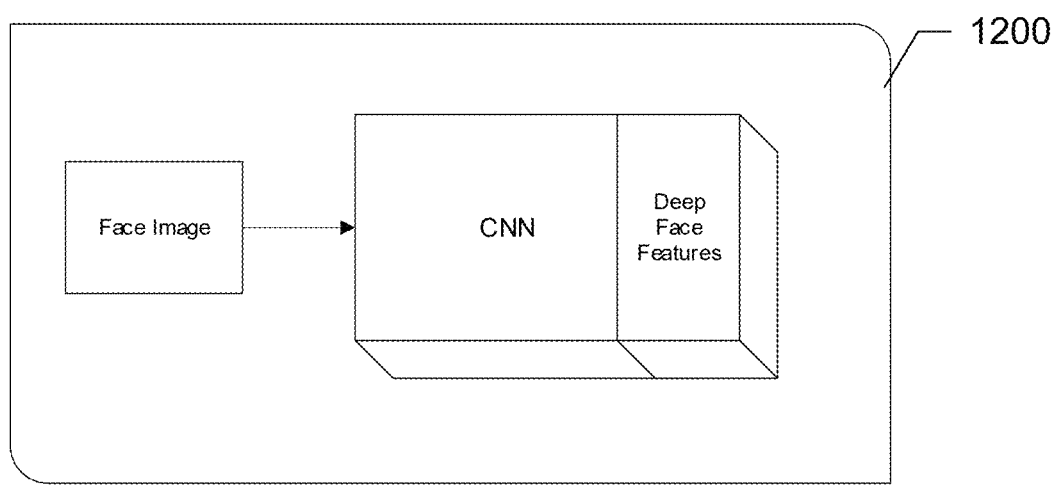
FIG. 12 illustrates a Deep Face Feature Extractor.

A Face Feature Extractor may be executed on the face landmarks of the images in a canonical space to calculate face features. One embodiment of a Face Feature Extractor is a Canonical Face Feature Extractor developed to extract hand engineered facial features from a set of calculations performed on the extracted face landmarks in a canonical space. Hand engineered features, examples of which are shown in Table 1, are features for which, by having deep knowledge about the application, the element included in the feature vector have been selected by a person. In embodiments it may not be preferable to hand select such features and instead use models wherein even the feature vectors have been learned automatically, for example, most of the deep learning models such as CNN. The Canonical Face Feature Extractor may be a set of calculations on face landmarks extracted from the image in a canonical space with or without a scaling aid. The scaling aid may help to create the canonical space for which the features can be extracted. In another embodiment this Face Feature Extractor utilizes a Deep Face Feature Extractor to extract facial embeddings (mappings of a discrete or categorical variable to a vector of continuous numbers) to be used by other systems or sub-systems. A Deep Face Feature Extractor 1200 may be trained with a convolutional neural network (CNN) using a Triplet Loss strategy, as illustrated in FIG. 12. In embodiments, the Deep Face Feature Extractor 1200 may be trained to operate on an image in a canonical space or the Deep Face Feature Extractor 1200 may be trained to operate on an image that is not in a canonical space, such as a metric space.

The Deep Face Feature Extractor 1200 may be trained to be used in different scenarios, such as with or without a scaling aid.

In another embodiment the physical data processing system may process images with other physical human features including, but not limited to the hand, feet, torso, upper body, or lower body.

Product System

The product is eyeglass frames and the advice or recommendations that accompany these recommendations.

Data for product include: social platforms, wholesalers, retailers, product guides, videos, specifications, interactions, social media posts, reviews, and the whole gamut of consumer-manufacturer interactions, images of the product, trends in sales data, style data related to aesthetics, community data (including demographics of the community). In short any data relating to eyeglasses, sunglasses, and potential other wearable items.

Create Canonical Frames

The product physical data processing system 302 are a set of processes, sub-processes, algorithms, commands, modifications, and calculation instructions used to create an accurate 3D model of the product, and placed into a standardized coordinate system. These 3D models are placed in a millimeter coordinate system. These 3D models are then rendered into a canonical space. The 3D model of the frame is rendered into a 2D image in a canonical space.

Figure 13:
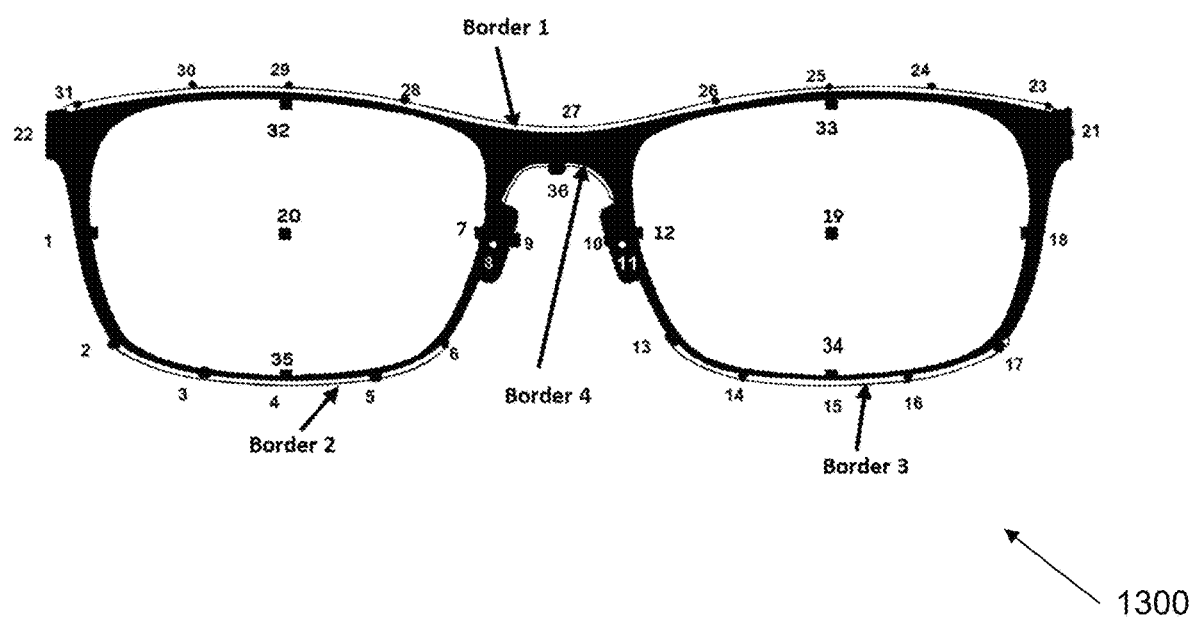
FIG. 13 illustrates Frame Landmarks

In one embodiment an eyeglass Frame Landmark Detector, an algorithm developed through statistical methods in the Learned Knowledge System, is used to extract frame landmarks. The 3D model of a frame is first rendered and then a Frame Landmark Detector is used to extract frame landmarks from the render of the 3D model. The 3D model of the frame may be rendered into a 2D image in a canonical space and then a Frame Landmark Detector is used to extract frame landmarks from the rendered two dimensional image. The 3D model may be rendered into a 3D space and then a Frame Landmark Detector is used to extract frame landmarks from the 3D render. The individual parts of the 3D model of the frame may be rendered separately and a Frame Landmark Detector is used to extract frame landmarks from the renders of the parts of the product. One embodiment of a frame landmark detector used within system 302 is an automated process that analyzes the 3D model of the product to identify the landmarks. The frame landmarks 1300 extracted by the Frame Landmark Detector are illustrated in FIG. 13. These frame landmarks may be used by any of the systems in this invention.

Frame Features

Figure 14:
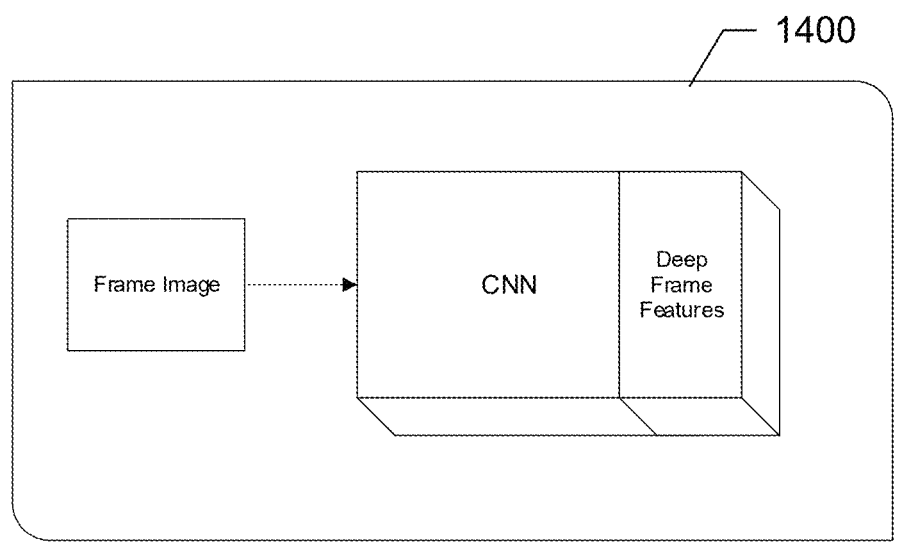
FIG. 14 illustrates a Deep Frame Feature Extractor

In one embodiment a Frame Feature Extractor may be executed on the frame landmarks from the frame images in a canonical space to identify and calculate frame features to be used by other systems and models. One embodiment of a Frame Feature Extractor is a Canonical Frame Feature Extractor developed within the Learned Knowledge System to extract hand engineered frame features from a set of calculations performed on the extracted frame landmarks in a canonical space. One embodiment of a set of hand engineered frame features calculated by the Canonical Frame Feature Extractor is shown in FIG. 13 and accompanying Table 2. In another embodiment this Frame Feature Extractor utilizes a Deep Frame Feature Extractor to extract frame embeddings. One embodiment of a Deep Frame Feature Extractor 1400, illustrated in FIG. 14, is trained within the Learned Knowledge System with a convolutional neural network (CNN) over a database of frames using a Triplet Loss strategy.

TABLE 2

Frame features calculated by the Canonical Frame Feature Extractor

| Feature type | Feature name | Feature description |
|---|---|---|
| Fit & Size | nosepad | distance between frame landmark #8 and frame landmark #11 |
| Fit & Size | chunky score | a score between 0 and 1 that estimates the chunkiness of the frame i.e., how thick it is |
| Fit & Size | Pupillary distance (PD) | distance between frame landmark #19 and frame landmark #20 |
| Fit & Size | lens height | distance between frame landmark #32 and frame landmark #35 |
| Fit & Size | lens width | distance between frame landmark #1 and frame landmark #7 |
| Fit & Size | lens area | area of one of the lenses in $mm^2$ |
| Fit & Size | front width | distance between frame landmark #21 and frame landmark #22 |
| Fit & Size | front height | distance between frame landmark #29 and frame landmark #4 |
| Fit & Size | front area | total area of the front part of the frame except for lenses |
| Fit & Size | bridge width | distance between frame landmark #9 and frame landmark #10 |
| Fit & Size | bridge height | distance between frame landmark #27 and frame landmark #36 |
| Shape | Frame shape | Features extracted from interpolated points on the edge contour of the front part of the frame |
| Shape | Brow line shape | Features extracted from interpolated points on the curve resulted from border 1 (refer to image of the frame) |
| Shape | Bridge shape | Features extracted from interpolated points on the curve resulted from border 4 (refer to image of the frame) |
| Color | Hue | Vector of top 5 hues sorted from most dominant to least dominant for region around each frame landmark |
| Color | Saturation | Vector of top 5 saturations sorted from most dominant to least dominant for region around each frame landmark |

Knowledge System

A knowledge system comprises various systems or sub-systems for storing, using, training, or serving computer models or data. A knowledge input database may be used in connection with the User System, the Product System, the Recommendation Serving System, Other Data Systems, the Learned Knowledge System and the Knowledge Adaptation System. The Knowledge System will use computers and servers and run software on them. The Knowledge System will have access to the data produced by other systems and will supply data to other systems and sub-systems as necessary over the standard protocols for electronic communications.

Machine Learning Models

The Learned Knowledge System may utilize supervised learning, semi-supervised learning, unsupervised learning, online learning, adaptive learning, teacher-student learning, meta-learning, or other learning techniques.

One embodiment of a machine learning model used by the Learned Knowledge System is a decision tree, such as a fine tree, a coarse tree, a medium tree, or an optimizable tree. Another embodiment of a machine learning model used by the Learned Knowledge System is discriminant analysis, such as a linear discriminant, a quadratic discriminant, or an optimizable discriminant. Another embodiment of a machine learning model used by the Learned Knowledge System is logistic regression classifiers. Another embodiment of a machine learning model used by the Learned Knowledge System is Naïve Bayes classifiers, such as a Gaussian Naïve Bayes, a Kernel Naïve Bayes, or an optimizable Naïve Bayes. Another embodiment of a machine learning model used by the Learned Knowledge System is a support vector machine (SVM), such as a linear SVM, a quadratic SVM, a cubic SVM, a Gaussian SVM or an optimizable SVM. Another embodiment of a machine learning model used by the Learned Knowledge System is a nearest neighbor classifier, such as a weighted KNN (k nearest neighbor model) or an optimizable KNN. Another embodiment of a machine learning model used by the Learned Knowledge System is an ensemble classifier, such as a boosted tree, a bagged tree and random forest, a bootstrap aggregation, or an optimizable ensemble.

The Learned Knowledge System may be used to develop models, train models, or store them, or a combination thereof that are served by the User System. These models may include face detection models, pose detection models, landmark detection models, boundary detector and segmenter models, boundary localizer models, deep learning models to estimate facial features, deep learning models to estimate facial measurements, face feature extractor models, models related to user stylistic profiles or preferences, models related to user social profiles or preferences, models related to user psychological profiles or preferences, models related to user product profiles or preferences, models related to the user's affinity with population segments, or models related to the user's affinity with stylists, or combinations thereof.

Canonical Face Feature Extractor

A Canonical Face Feature Extractor may calculate hand-engineered face features from face landmarks in a canonical space (FIG. 11 and Table 1). A Deep Face Feature Extractor may be trained using a convolutional neural network (CNN) with a triplet-loss strategy (FIG. 12) over a database of face images, such as dataset of face images that contains both an image of a face and an image of the same face with a standard sized plastic card, such as a credit card.

A Canonical Frame Feature Extractor 1200 may be developed and stored that calculates hand-engineered frame features from frame landmarks in a canonical space (FIG. 13 and Table 2).

A Deep Frame Feature Extractor may be trained, used, and stored and using a convolutional neural network with a triplet-loss strategy over a database of frame images where the frame images are labelled with a frame identifier, such as a UPC number.

Relative Face: Frame Features

A Relative Face: Frame Feature Extractor may be a Canonical Relative Face: Frame Feature Extractor that extracts hand-engineered relative face: frame features, as illustrated in Table 3, from a set of calculations performed on a set of face landmarks in a canonical space and a set of frame landmarks in a canonical space and pose. As used in Table 3, the Diagonal distance is the L2 norm Euclidean distance, the Vertical distance is the Distance between the y elements=y2−y1, and the Horizontal distance is the Distance between the x elements=x2−x1.

TABLE 3

Relative face:frame features calculated by the Relative Face:Frame Feature Extractor

| # | Feature name | Feature description |
|---|---|---|
| 1 | left pupil of the face and left lens center of the frame | diagonal distance between face landmark #80 and frame landmark #20 |
| 2 | left pupil of the face and left lens center of the frame | horizontal distance between face landmark #80 and frame landmark #20 |
| 3 | left pupil of the face and left lens center of the frame | vertical distance between face landmark #80 and frame landmark #20 |
| 4 | right pupil of the face and right lens center of the frame | diagonal distance between face landmark #94 and frame landmark #19 |
| 5 | right pupil of the face and right lens center of the frame | horizontal distance between face landmark #94 and frame landmark #19 |
| 6 | right pupil of the face and right lens center of the frame | vertical distance between face landmark #94 and frame landmark #19 |
| 7 | left pupil of the face and left lens brow point of the frame | diagonal distance between face landmark #80 and frame landmark #31 |
| 8 | left pupil of the face and left lens brow point of the frame | horizontal distance between face landmark #80 and frame landmark #31 |
| 9 | left pupil of the face and left lens brow point of the frame | vertical distance between face landmark #80 and frame landmark #31 |
| 10 | right pupil of the face and right lens brow point of the frame | diagonal distance between face landmark #94 and frame landmark #23 |
| 11 | right pupil of the face and right lens brow point of the frame | horizontal distance between face landmark #94 and frame landmark #23 |
| 12 | right pupil of the face and right lens brow point of the frame | vertical distance between face landmark #94 and frame landmark #23 |
| 13 | left contour of the face and left lens edge of the frame | diagonal distance between face landmark #1 and frame landmark #22 |
| 14 | left contour of the face and left lens edge of the frame | horizontal distance between face landmark #1 and frame landmark #22 |
| 15 | left contour of the face and left lens edge of the frame | vertical distance between face landmark #1 and frame landmark #22 |
| 16 | right contour of the face and right lens edge of the frame | diagonal distance between face landmark #33 and frame landmark #21 |
| 17 | right contour of the face and right lens edge of the frame | diagonal distance between face landmark #33 and frame landmark #21 |
| 18 | right contour of the face and right lens edge of the frame | vertical distance between face landmark #33 and frame landmark #21 |
| 19 | left contour of the face and left lens brow point of the frame | diagonal distance between face landmark #1 and frame landmark #31 |
| 20 | left contour of the face and left lens brow point of the frame | horizontal distance between face landmark #1 and frame landmark #31 |

TABLE 3-continued

Relative face:frame features calculated by the Relative Face:Frame Feature Extractor

| # | Feature name | Feature description |
|---|---|---|
| 21 | left contour of the face and left lens brow point of the frame | vertical distance between face landmark #1 and frame landmark #31 |
| 22 | right contour of the face and right lens brow point of the frame | diagonal distance between face landmark #33 and frame landmark #21 |
| 23 | right contour of the face and right lens brow point of the frame | diagonal distance between face landmark #33 and frame landmark #21 |
| 24 | right contour of the face and right lens brow point of the frame | vertical distance between face landmark #33 and frame landmark #21 |
| 25 | left eye outer point of the face and left lens brow point of the frame | diagonal distance between face landmark #72 and frame landmark #31 |
| 26 | left eye outer point of the face and left lens brow point of the frame | horizontal distance between face landmark #72 and frame landmark #31 |
| 27 | left eye outer point of the face and left lens brow point of the frame | vertical distance between face landmark #72 and frame landmark #31 |
| 28 | right eye outer point of the face and right lens brow point of the frame | diagonal distance between face landmark #90 and frame landmark #23 |
| 29 | right eye outer point of the face and right lens brow point of the frame | horizontal distance between face landmark #90 and frame landmark #23 |
| 30 | right eye outer point of the face and right lens brow point of the frame | vertical distance between face landmark #90 and frame landmark #23 |
| 31 | left eye inner point of the face and nosepad center of the frame | diagonal distance between face landmark #76 and frame landmark #8 |
| 32 | left eye inner point of the face and nosepad center of the frame | horizontal distance between face landmark #76 and frame landmark #8 |
| 33 | left eye inner point of the face and nosepad center of the frame | vertical distance between face landmark #76 and frame landmark #8 |
| 34 | right eye inner point of the face and nosepad center of the frame | diagonal distance between face landmark #86 and frame landmark #11 |
| 35 | right eye inner point of the face and nosepad center of the frame | horizontal distance between face landmark #86 and frame landmark #11 |
| 36 | right eye inner point of the face and nosepad center of the frame | vertical distance between face landmark #86 and frame landmark #11 |
| 37 | left eye inner point of the face and left lens right center point of the frame | diagonal distance between face landmark #76 and frame landmark #7 |
| 38 | left eye inner point of the face and left lens right center point of the frame | horizontal distance between face landmark #76 and frame landmark #7 |
| 39 | left eye inner point of the face and left lens right center point of the frame | vertical distance between face landmark #76 and frame landmark #7 |
| 40 | Right eye inner point of the face and left lens right center point of the frame | diagonal distance between face landmark #86 and frame landmark #12 |
| 41 | Right eye inner point of the face and left lens right center point of the frame | horizontal distance between face landmark #86 and frame landmark #12 |
| 42 | Right eye inner point of the face and left lens right center point of the frame | vertical distance between face landmark #86 and frame landmark #12 |
| 43 | left eye outer point of the face and left lens left center point of the frame | diagonal distance between face landmark #72 and frame landmark #1 |
| 44 | left eye outer point of the face and left lens left center point of the frame | Horizontal distance between face landmark #72 and frame landmark #1 |
| 45 | left eye outer point of the face and left lens left center point of the frame | vertical distance between face landmark #72 and frame landmark #1 |
| 46 | right eye outer point of the face and right lens right center point of the frame | vertical distance between face landmark #90 and frame landmark #18 |
| 47 | right eye outer point of the face and right lens right center point of the frame | horizontal distance between face landmark #90 and frame landmark #18 |
| 48 | right eye outer point of the face and right lens right center point of the frame | vertical distance between face landmark #90 and frame landmark #18 |
| 49 | left eye top point of the face and left lens top center point of the frame | diagonal distance between face landmark #74 and frame landmark #32 |
| 50 | left eye top point of the face and left lens top center point of the frame | horizontal distance between face landmark #74 and frame landmark #32 |
| 51 | left eye top point of the face and left lens top center point of the frame | vertical distance between face landmark #74 and frame landmark #32 |
| 52 | right eye top point of the face and right lens top center point of the frame | diagonal distance between face landmark #88 and frame landmark #33 |
| 53 | right eye top point of the face and right lens top center point of the frame | horizontal distance between face landmark #88 and frame landmark #33 |
| 54 | right eye top point of the face and right lens top center point of the frame | vertical distance between face landmark #88 and frame landmark #33 |
| 55 | left eye bottom point of the face and left lens bottom center point of the frame | diagonal distance between face landmark #78 and frame landmark #35 |
| 56 | left eye bottom point of the face and left lens bottom center point of the frame | horizontal distance between face landmark #78 and frame landmark #35 |
| 57 | left eye bottom point of the face and left lens bottom center point of the frame | vertical distance between face landmark #78 and frame landmark #35 |

TABLE 3-continued

Relative face:frame features calculated by the Relative Face:Frame Feature Extractor

| # | Feature name | Feature description |
|---|---|---|
| 58 | right eye bottom point of the face and right lens bottom center point of the frame | diagonal distance between face landmark #92 and frame landmark #34 |
| 59 | right eye bottom point of the face and right lens bottom center point of the frame | horizontal distance between face landmark #92 and frame landmark #34 |
| 60 | right eye bottom point of the face and right lens bottom center point of the frame | vertical distance between face landmark #92 and frame landmark #34 |
| 61 | left first brow point of the face and left first brow point of the frame | diagonal distance between face landmark #34 and frame landmark #31 |
| 62 | left first brow point of the face and left first brow point of the frame | horizontal distance between face landmark #34 and frame landmark #31 |
| 63 | left first brow point of the face and left first brow point of the frame | vertical distance between face landmark #34 and frame landmark #31 |
| 64 | right first brow point of the face and right first brow point of the frame | diagonal distance between face landmark #47 and frame landmark #23 |
| 65 | right first brow point of the face and right first brow point of the frame | horizontal distance between face landmark #47 and frame landmark #23 |
| 66 | right first brow point of the face and right first brow point of the frame | vertical distance between face landmark #47 and frame landmark #23 |
| 67 | left second brow point of the face and left second brow point of the frame | diagonal distance between face landmark #35 and frame landmark #30 |
| 68 | left second brow point of the face and left second brow point of the frame | horizontal distance between face landmark #35 and frame landmark #30 |
| 69 | left second brow point of the face and left second brow point of the frame | vertical distance between face landmark #35 and frame landmark #30 |
| 70 | right second brow point of the face and right second brow point of the frame | diagonal distance between face landmark #46 and frame landmark #24 |
| 71 | right second brow point of the face and right second brow point of the frame | horizontal distance between face landmark #46 and frame landmark #24 |
| 72 | right second brow point of the face and right second brow point of the frame | vertical distance between face landmark #46 and frame landmark #24 |
| 73 | left third brow point of the face and left third brow point of the frame | diagonal distance between face landmark #36 and frame landmark #29 |
| 74 | left third brow point of the face and left third brow point of the frame | horizontal distance between face landmark #36 and frame landmark #29 |
| 75 | left third brow point of the face and left third brow point of the frame | vertical distance between face landmark #36 and frame landmark #29 |
| 76 | right third brow point of the face and right third brow point of the frame | diagonal distance between face landmark #45 and frame landmark #25 |
| 77 | right third brow point of the face and right third brow point of the frame | horizontal distance between face landmark #45 and frame landmark #25 |
| 78 | right third brow point of the face and right third brow point of the frame | vertical distance between face landmark #45 and frame landmark #25 |
| 79 | left forth brow point of the face and left forth brow point of the frame | diagonal distance between face landmark #37 and frame landmark #28 |
| 80 | left forth brow point of the face and left forth brow point of the frame | horizontal distance between face landmark #37 and frame landmark #28 |
| 81 | left forth brow point of the face and left forth brow point of the frame | vertical distance between face landmark #37 and frame landmark #28 |
| 82 | right forth brow point of the face and right forth brow point of the frame | diagonal distance between face landmark #44 and frame landmark #26 |
| 83 | right forth brow point of the face and right forth brow point of the frame | horizontal distance between face landmark #44 and frame landmark #26 |
| 84 | right forth brow point of the face and right forth brow point of the frame | vertical distance between face landmark #44 and frame landmark #26 |
| 85 | left fifth brow point of the face and left fifth brow point of the frame | diagonal distance between face landmark #38 and frame landmark #27 |
| 86 | left fifth brow point of the face and left fifth brow point of the frame | horizontal distance between face landmark #38 and frame landmark #27 |
| 87 | left fifth brow point of the face and left fifth brow point of the frame | vertical distance between face landmark #38 and frame landmark #27 |
| 88 | right fifth brow point of the face and right fifth brow point of the frame | diagonal distance between face landmark #43 and frame landmark #27 |
| 89 | right fifth brow point of the face and right fifth brow point of the frame | horizontal distance between face landmark #43 and frame landmark #27 |
| 90 | right fifth brow point of the face and right fifth brow point of the frame | vertical distance between face landmark #43 and frame landmark #27 |
| 91 | mid forehead point of the face and left brow point of the frame | diagonal distance between face landmark #126 and frame landmark #31 |
| 92 | mid forehead point of the face and left brow point of the frame | horizontal distance between face landmark #126 and frame landmark #31 |

TABLE 3-continued

Relative face:frame features calculated by the Relative Face:Frame Feature Extractor

| # | Feature name | Feature description |
|---|---|---|
| 93 | mid forehead point of the face and left brow point of the frame | vertical distance between face landmark #126 and frame landmark #31 |
| 94 | mid forehead point of the face and right brow point of the frame | diagonal distance between face landmark #126 and frame landmark #23 |
| 95 | mid forehead point of the face and right brow point of the frame | horizontal distance between face landmark #126 and frame landmark #23 |
| 96 | mid forehead point of the face and right brow point of the frame | vertical distance between face landmark #126 and frame landmark #23 |
| 97 | left fifth cheek point of the face and left fifth cheek point of the frame | diagonal distance between face landmark #85 and frame landmark #6 |
| 98 | left fifth cheek point of the face and left fifth cheek point of the frame | horizontal distance between face landmark #85 and frame landmark #6 |
| 99 | left fifth cheek point of the face and left fifth cheek point of the frame | vertical distance between face landmark #85 and frame landmark #6 |
| 100 | right fifth cheek point of the face and right fifth cheek point of the frame | diagonal distance between face landmark #99 and frame landmark #13 |
| 101 | right fifth cheek point of the face and right fifth cheek point of the frame | horizontal distance between face landmark #99 and frame landmark #13 |
| 102 | right fifth cheek point of the face and right fifth cheek point of the frame | vertical distance between face landmark #99 and frame landmark #13 |
| 103 | left forth cheek point of the face and left forth cheek point of the frame | diagonal distance between face landmark #84 and frame landmark #5 |
| 104 | left forth cheek point of the face and left forth cheek point of the frame | horizontal distance between face landmark #84 and frame landmark #5 |
| 105 | left forth cheek point of the face and left forth cheek point of the frame | vertical distance between face landmark #84 and frame landmark #5 |
| 106 | right forth cheek point of the face and right forth cheek point of the frame | diagonal distance between face landmark #98 and frame landmark #14 |
| 107 | right forth cheek point of the face and right forth cheek point of the frame | horizontal distance between face landmark #98 and frame landmark #14 |
| 108 | right forth cheek point of the face and right forth cheek point of the frame | vertical distance between face landmark #98 and frame landmark #14 |
| 109 | left third cheek point of the face and left third cheek point of the frame | diagonal distance between face landmark #83 and frame landmark #4 |
| 110 | left third cheek point of the face and left third cheek point of the frame | horizontal distance between face landmark #83 and frame landmark #4 |
| 111 | left third cheek point of the face and left third cheek point of the frame | vertical distance between face landmark #83 and frame landmark #4 |
| 112 | right third cheek point of the face and right third cheek point of the frame | diagonal distance between face landmark #97 and frame landmark #15 |
| 113 | right third cheek point of the face and right third cheek point of the frame | horizontal distance between face landmark #97 and frame landmark #15 |
| 114 | right third check point of the face and right third cheek point of the frame | vertical distance between face landmark #97 and frame landmark #15 |
| 115 | left second cheek point of the face and left second cheek point of the frame | diagonal distance between face landmark #82 and frame landmark #3 |
| 116 | left second cheek point of the face and left second cheek point of the frame | horizontal distance between face landmark #82 and frame landmark #3 |
| 117 | left second cheek point of the face and left second cheek point of the frame | vertical distance between face landmark #82 and frame landmark #3 |
| 118 | right second cheek point of the face and right second cheek point of the frame | diagonal distance between face landmark #96 and frame landmark #16 |
| 119 | right second cheek point of the face and right second cheek point of the frame | horizontal distance between face landmark #96 and frame landmark #16 |
| 120 | right second cheek point of the face and right second cheek point of the frame | vertical distance between face landmark #96 and frame landmark #16 |
| 121 | left first cheek point of the face and left first cheek point of the frame | diagonal distance between face landmark #81 and frame landmark #2 |
| 122 | left first cheek point of the face and left first cheek point of the frame | horizontal distance between face landmark #81 and frame landmark #2 |
| 123 | left first cheek point of the face and left first cheek point of the frame | vertical distance between face landmark #81 and frame landmark #2 |
| 124 | right first cheek point of the face and right first cheek point of the frame | diagonal distance between face landmark #95 and frame landmark #17 |
| 125 | right first cheek point of the face and right first cheek point of the frame | Horizontal distance between face landmark #95 and frame landmark #17 |
| 126 | right first cheek point of the face and right first cheek point of the frame | vertical distance between face landmark #95 and frame landmark #17 |
| 127 | mid contour point of the face and left cheek point of the frame | diagonal distance between face landmark #17 and frame landmark #4 *middle |
| 128 | mid contour point of the face and left cheek point of the frame | horizontal distance between face landmark #17 and frame landmark #4 |
| 129 | mid contour point of the face and left cheek point of the frame | vertical distance between face landmark #17 and frame landmark #4 |
| 130 | mid contour point of the face and right cheek point of the frame | diagonal distance between face landmark #17 and frame landmark #15 *middle |

TABLE 3-continued

Relative face:frame features calculated by the Relative Face:Frame Feature Extractor

| # | Feature name | Feature description |
|---|---|---|
| 131 | mid contour point of the face and right cheek point of the frame | horizontal distance between face landmark #17 and frame landmark #15 |
| 132 | mid contour point of the face and right cheek point of the frame | vertical distance between face landmark #17 and frame landmark #15 |

The Learned Knowledge System may be used to store one or more approaches or embodiments to develop a Combined Feature Vector. In one embodiment a Combined Feature Vector can combine features from various system through a process of differentiation, concatenation, or some other approach. The hand engineered features calculated from the Canonical Face Feature Extractor can be combined with the hand engineered frame features calculated by the Canonical Frame Feature Extractor to create a Combined Feature Vector. The hand-engineered Shape features calculated by the Canonical Face Feature Extractor that are listed in Table 1, and which correspond to the landmarks shown in FIG. 11, can be combined with the hand-engineered Shape features calculated by the Canonical Frame Feature Extractor that are listed in Table 2, and which correspond to the landmarks shown in FIG. 13 to create a Combined Shape Feature Vector. The hand-engineered Color features calculated by the Canonical Face Feature Extractor that are listed in Table 1, and which correspond to the landmarks shown in FIG. 11, can be combined with the hand-engineered Color features calculated by the Canonical Frame Feature Extractor that are listed in Table 2, and which correspond to the landmarks shown in FIG. 13 to create a Combined Color Feature Vector. The hand engineered features calculated by the Canonical Face Feature Extractor can be combined with the hand engineered frame features calculated by the Canonical Frame Feature Extractor and the hand engineered relative face: frame features calculated by the Canonical Relative Face: Frame Feature Extractor. The hand-engineered Fit & Size features calculated by the Canonical Face Feature Extractor that are listed in Table 1, and which correspond to the landmarks shown in FIG. 11, can be combined with the hand-engineered Fit & Size features calculated by the Canonical Frame Feature Extractor that are listed in Table 2, and which correspond to the landmarks shown in FIG. 13, and combined with the relative face: frame features calculated by the Relative Face: Frame Feature Extractor, as shown in Table 3 to create a Combined Fit & Size Feature Vector.

In one embodiment deep face features calculated by the Deep Face Feature Extractor 1200 as illustrated in FIG. 12 may be combined with deep frame features calculated by the Deep Frame Feature Extractor as illustrated in FIG. 14 to create a Combined Deep Feature Vector.

In one embodiment, the reco input system (recommendation input system) combines hand engineered features from one system with deep features from another system to create a Combined Feature Vector.

In embodiments, the Learned Knowledge System may be used to train a Single Path Deep Feature Generation Model using a convolutional neural network trained over a database of images of frames being worn by individuals to extract deep features and create a Combined Deep Feature Vector. The Learned Knowledge System is used to store a Single Path Deep Feature Generation Model. In embodiments, training of the model may also use artificially generated combinations of faces and frames from the canonical space of frames and the canonical space of faces.

The Learned Knowledge System uses expert knowledge to train models. These experts may be experts knowledgeable in the product domain, in the user domain, in both product and user domains, or in another domain where that expert's knowledge can be utilized to improve the quality of the product recommendation provided to the user. These experts may be influencers in the social domain.

Expert Knowledge

Expert knowledge may be used to provide an expert rating score relating to how well a particular frame suits a particular individual. The rating score may be a numerical score with the lowest score being the lowest rating possible and the highest number represents the highest rating possible. For instance a score of 1 to 5 may be used where 1 represents the lowest rating possible and 5 represents the highest rating possible regarding how well a particular frame suits a particular individual.

TABLE 4

Predictors by category

| Categories | Predictors |
|---|---|
| Size | Frame width |
|  | Frame Height |
| Shape | Frame shape relative to face |
|  | Frame brow line shape |
|  | Bridge shape/placement |
| Fit | Bridge thickness |
|  | Bridge fit/width |
|  | Frame brow line position |
|  | Frame cheek line position |
|  | Frame distance to eye |
| Color | Tone |
|  | Pattern/Multicolor |
|  | Boldness |
|  | Brightness |

In one embodiment expert knowledge is used to provide ratings on characteristics that impact how well a particular frame suits a particular individual. These characteristics are called predictors. These predictors may be aggregated into categories of predictors. One embodiment of a categorized set of predictors is illustrated in Table 4. These categories of predictors are categories that may be commonly used by opticians or experts in the optical domain to evaluate the suitability of a particular frame for a particular user or to determine whether or not to recommend a particular frame to a particular user. These categories of characteristics include the size, shape, fit and color of the frame in relation to the face of an individual. In one embodiment size predictors relate to the recommended suitability of the size or measurement of certain components of the product in relation to the size or measurement of certain physical or anatomical components of the user. An example of a size predictor is the recommended suitability of the width of certain elements of the product in relation to the width of the user's face taken at certain defined locations. In one embodiment fit predictors relate to the recommended suitability of the fit of certain components of the product in relation to certain physical or anatomical components of the user. An example of a fit predictor is the recommended fit suitability of the bridge of a pair of eyeglasses in relation to the nose bridge of a user. In one embodiment shape predictors relate to the recommended suitability of the shape of certain components of the product in relation to certain physical or anatomical components of the user. An example of a shape predictor is the recommended suitability of the shape of certain elements of the frame in relation to the shape of the user's face or facial features at certain defined locations. In some embodiments these shape predictors may be scale invariant. In other embodiments these shape predictors may vary with scale. These color predictors may relate to the recommended suitability of certain color elements of the product in relation to certain color elements of certain physical or anatomical components of the user. An optician or expert in the optical domain might assign one of a number of alternative values or classes to individual predictors based on their expert knowledge. One embodiment of these alternative values or classes for each predictor is illustrated in Table 5.

both the frame and the individual in the overlaid image have an identification label attached to the overlaid image, where the pose of the frame in the rendered image of the frame is rendered to be the same as the pose of the face in the image of the face and the coordinate points for where the image of the frame are overlaid onto the image of the face are based on a set of defined and extracted landmarks of the frame in the image of the frame and a set of defined and extracted landmarks of the face in the image of the face so that the superimposition represents a close approximation of how the individual frames in the image would actually be worn by the individual in the image.

In some embodiments the average coordinate value of the landmarks of the frames #9 and #10 are aligned with the average coordinate value of the landmarks of the face #52, #53, #56, #65, #66 and #69 and then the frame image is overlaid on the face image. The expert rating score or the expert assigned class to an individual predictor is then applied as a label to the resulted synthetic image.

The expert rating score or the expert assigned class to an individual predictor is provided by an expert viewing a particular frame being worn by a particular individual. In one embodiment a reference image of the particular frame being worn by the particular individual is taken. The expert

TABLE 5

Predictor values or classes

| Predictors | Classes | | | | | |
|---|---|---|---|---|---|---|
| Frame width | Proper width | Too wide | Too narrow | | | |
| Frame height | Proper height | Too tall | Too short | | | |
| Frame shape relative to face | Flattering | Proper | Poor | | | |
| Frame brow line shape | Properly follows | Does not follow properly | | | | |
| Bridge placement | Flattering | Proper | Poor | | | |
| Bridge shape | Flattering | Proper | Poor | | | |
| Nose shape | Prominent | Slight | | | | |
| Nose shape width | Wide | Narrow | | | | |
| Bridge thickness | Flattering | Proper | Poor | | | |
| Bridge fit/width | Properly fits | Too wide/loose | Too narrow/tight | | | |
| Frame brow line position | Proper height | Too high | Too low | | | |
| Frame cheek line position | Properly follows | Too high | Too low | | | |
| Frame distance to eye | Flattering | Proper | Poor | | | |
| Tone | Match | Not a match | | | | |
| Pattern/Multicolor | Match | Not a match | | | | |
| Boldness | Proper | Too bold | Not bold enough | | | |
| Brightness | Proper | Too bright | Not bright enough | | | |
| Face shape | Oval | Oblong | Heart | Square | Diamond | Round |

The expert rating score or the expert assigned class to an individual predictor may be provided by an expert viewing an image of a particular frame being worn by a particular individual, where both the frame and the individual in the image have an identification label attached to the image. The expert rating score or the expert assigned class to an individual predictor may then be applied as a label to the image.

The expert rating score or the expert assigned class to an individual predictor is provided by an expert viewing an image of a particular frame in a canonical space overlaid onto an image of a particular user in canonical space, where rating score or the expert assigned class to an individual predictor is then applied as a label to the image.

Expert ratings may be saved in a tabular format that contains an expert identification number, image name, frame identification number, individual or user identification number, and rating fields, including any expert rating score or expert assigned classes to individual predictors.

A training dataset may be developed that contains the expert data along with all normalized faces and frames in a canonical space.

The expert knowledge used to provide the expert rating score or the expert assigned class to an individual predictor is provided by opticians or experts in the optical domain. The number of opticians or experts in the optical domain providing an expert rating score or the expert assigned class to an individual predictor for an individual frame for an individual user may be one or more than one. If more than one expert provides a rating score or an expert assigned class to an individual predictor for an individual frame for an individual user then a method to create a consensus expert rating or an expert assigned class to an individual predictor for that individual frame for an individual user may be used. One method for creating a consensus expert rating score is a voting system. Another method may incorporate a method for excluding outlier ratings. Another method may incorporate the use of statistical methods, such as the mean, medium or mode, where the output of the statistical method may include a rounding up or down. Another method may include the use of outlier analysis across the set of all expert ratings and experts to remove the ratings of certain experts on certain frames and individuals. Another method may include a weighting system across experts where the ratings for certain experts are given more weight than the ratings from other experts across all the images of frames and individuals or where the ratings from certain experts are given more weight than the ratings from other experts for certain frames or for certain individuals or for a combination of certain frames and individuals.

In another embodiment the expert knowledge used to provide the expert rating score or the expert assigned class to an individual predictor is from another type of expert. One example of another type of expert is a stylist. Another example of another type of expert is a social influencer.

The expert knowledge and expert ratings or classifications provided by different types of experts are kept separate. The expert knowledge and expert ratings or classifications provided by different types of experts are combined through a weighting system. The expert knowledge and expert ratings or classifications provided by different types of experts are combined through an ensemble system. An ensemble system my use multiple models or hypotheses and may include also multiple classifier systems. For example, an ensemble system may train many subsystems, each with different parameters and settings, then combine the results of all subsystems together.

Predictor Models

A Score Prediction Model may be trained using data gathered related to expert ratings, as noted in previous paragraphs. The Score Prediction Model output may be a predicted expert rating score, which may be used as an expert recommendation score on individual eyeglass frames for an individual user. The Score Prediction Model may be a machine learning classification model that outputs an overall rating score or recommendation score, ranging from 1 to 5, where the overall rating or recommendation score represents the rating class with the highest confidence. The Score Prediction Model may be a machine learning regression model that outputs an overall rating or recommendation score where the rating or recommendation score is a real number ranging from 1 to 5.

Figure 17:
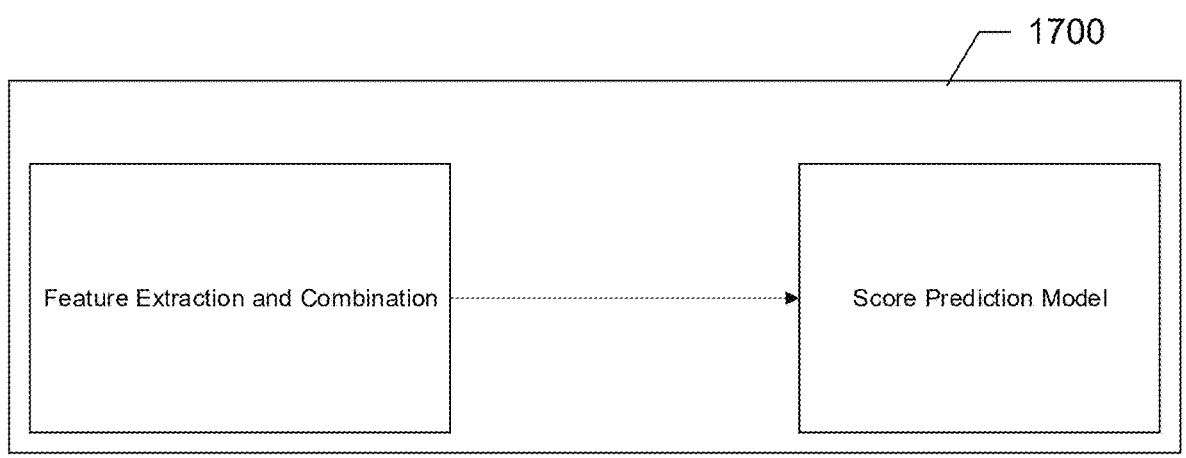
FIG. 17 illustrates an End-to-end Score Prediction Model utilizing feature extraction

A Score Prediction Model may also be trained in this sub-system. A Score Prediction Model may be an End-to-end Score Prediction Model 1700 (FIG. 17) using a machine learning algorithm and architecture, such as random forests over a Combined Feature Vector of face features and frame features. A Score Prediction Model may be based on a machine learning algorithm and architecture.

Another embodiment of a machine learning algorithm and architecture that could be used is a decision tree, such as a fine tree, a coarse tree, a medium tree, or an optimizable tree.

The Learned Knowledge System may be used to train Predictor Models using a machine learning algorithm and architecture, such as a random forest over a combined feature vector to learn individual predictor class labels in our training set. The random forest for individual predicators may be trained over the combined feature vector of hand engineered features or over combined deep feature vectors. Some examples of feature vectors are listed in Table 4, such as the Fit or Size categories are trained over the Combined Fit & Size Feature Vector. Others include a Shape category trained over the Combined Shape Feature Vector, the Color category trained over the Combined Color Feature Vector. Other individual Predictor Models may be trained over the Combined Deep Feature Vector(s) or over any other Combined Feature Vector. The training may use any of the machine learning techniques mentioned above or others.

Figure 18:
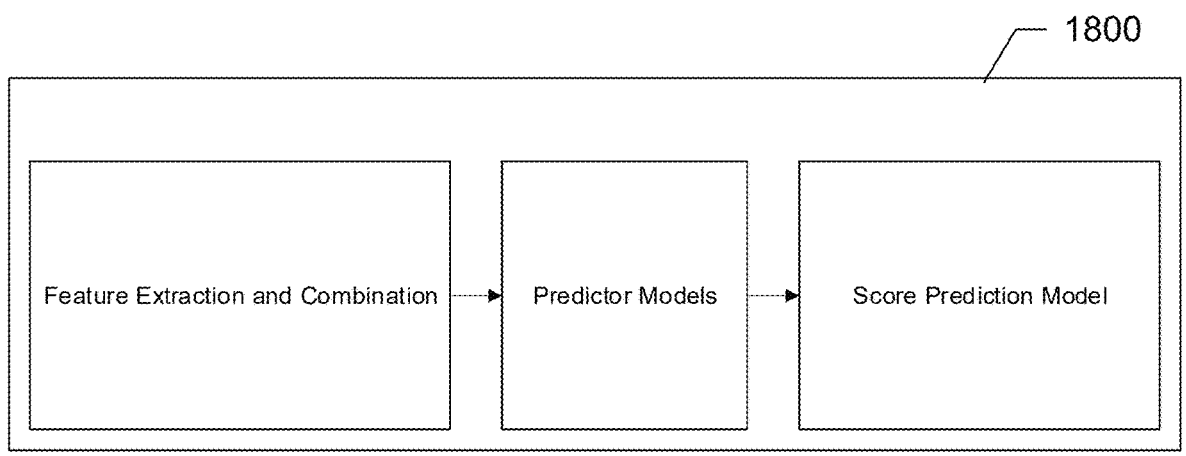
FIG. 18 illustrates a Score Prediction Model using Predictor Models and feature extraction

A Score Prediction Model may be trained using Predictor Models 1800 (FIG. 18) using any machine learning architecture, such as a random forest over the predictor class labels to learn the expert rating score. The systems then store these predictor models.

Figure 19:
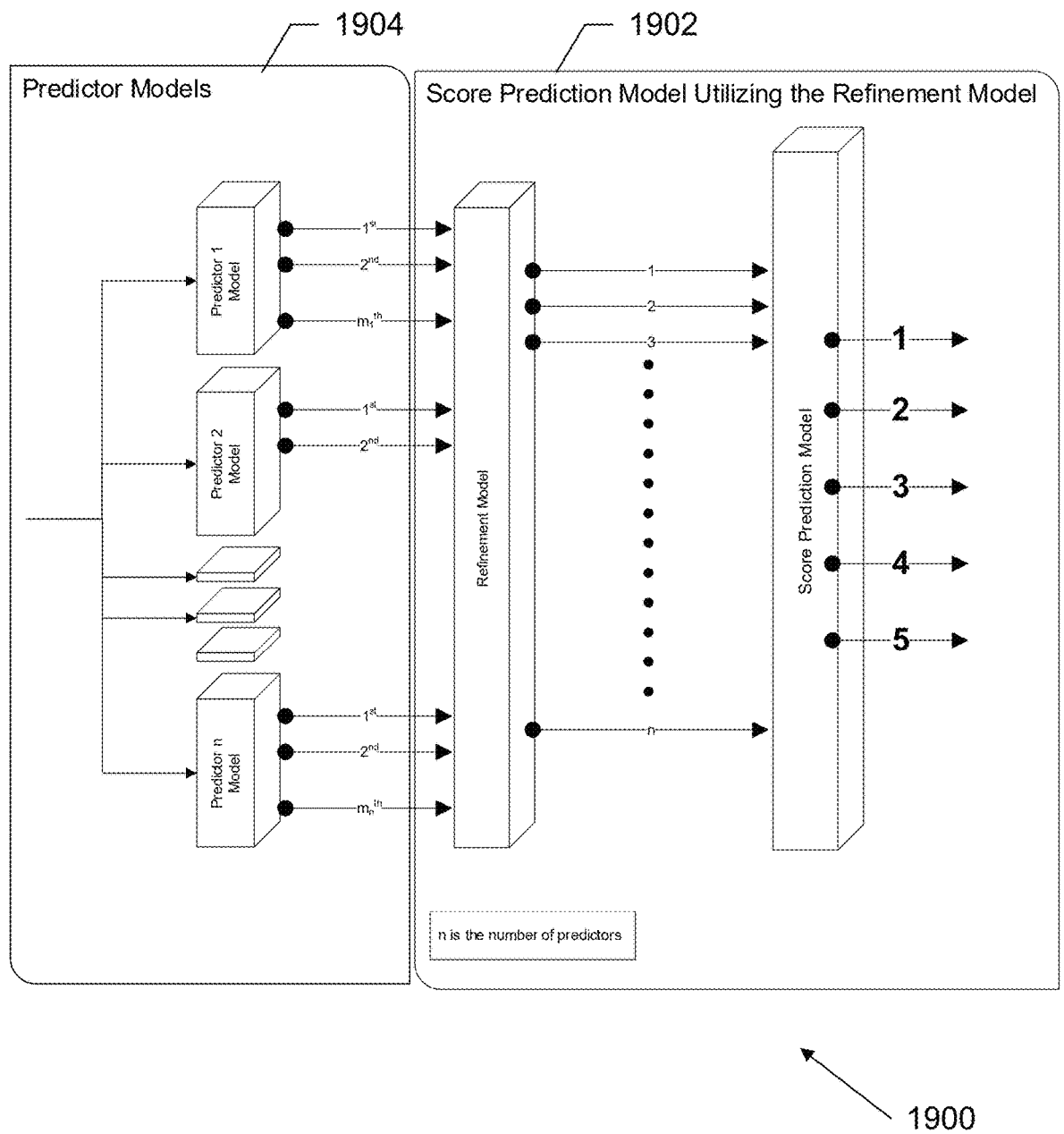
FIG. 19 illustrates a Score Prediction Model utilizing a Refinement model

The Learned Knowledge System is used to train a Refinement Model 1900 to be used with the Score Prediction Model 1902 by loading the pre-trained Score Prediction Model 1904 using Predictor Models and feed-forwarding the training data to calculate the combined feature vector and pass it to each predictor (FIG. 19). For example, the predictions generated by multiple Predictor Models may go through a Refinement Model to be combined, aggregated, and refined. The output then may be transmitted to the Score Prediction Model. The Refinement Model is any machine learning method such as a random forest that can then be trained over the predictors' output to learn the deviations from the learned expert rating score that initially loaded. The Learned Knowledge System is used to store a Refinement Model to be used with the Score Prediction Model.

Figure 20:
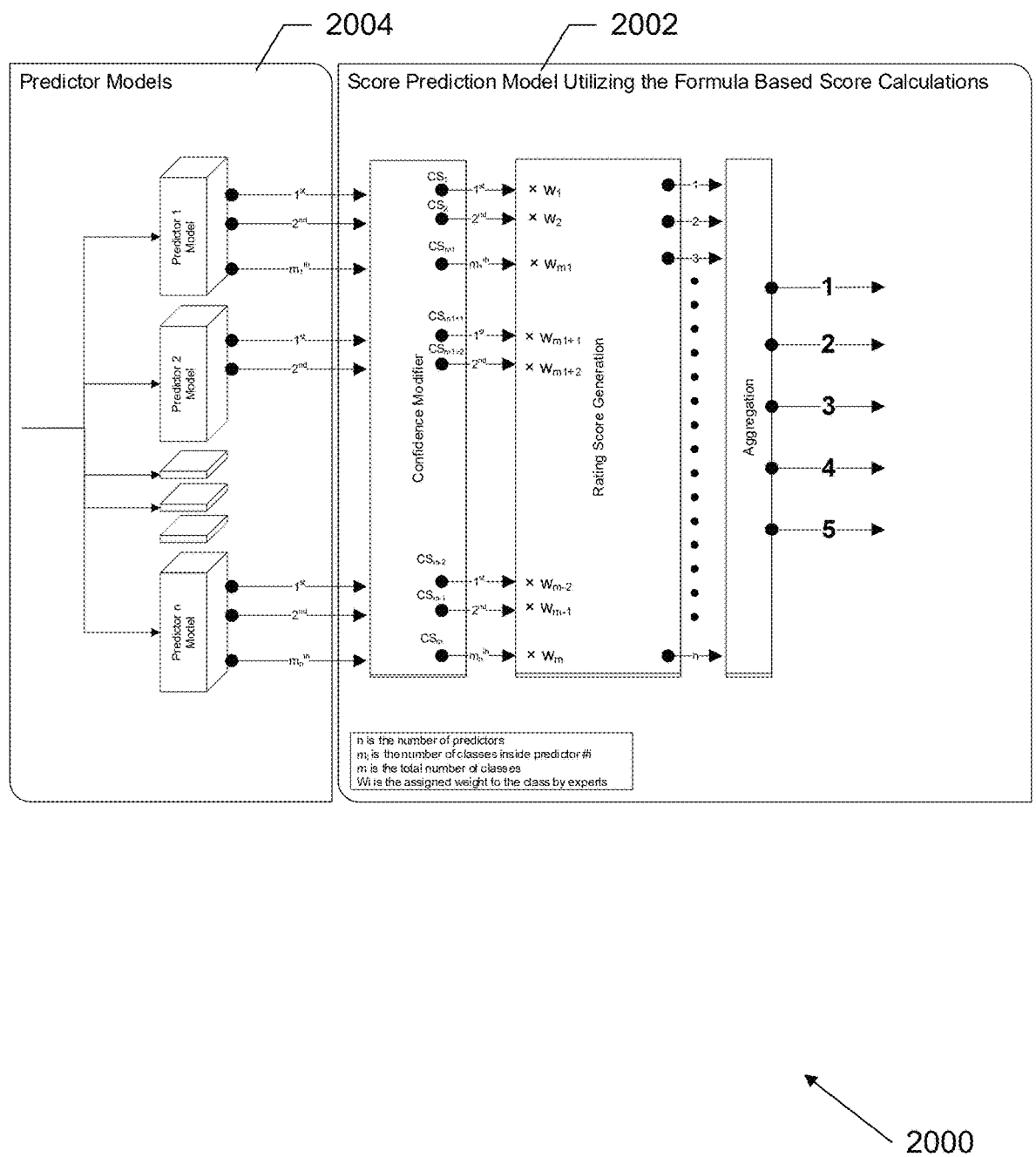
FIG. 20 illustrates a Score Prediction Model utilizing a Formula Based Score Calculation

The Learned Knowledge System is used to develop a Score Prediction Model based upon a Formula Based Score Calculation 2000 (FIG. 20). The Learned Knowledge System is used to store a Formula Based Score Calculation 2002. In one embodiment this Formula Based Score Calculation uses the confidence scores generated by each Predictor Model 2004 for the individual alternative classes within each Predictor Model, along with a weighting system for these classes to come up with an overall rating or recommendation score for a particular frame for a particular user.

Social or Social Milieu Data

Demographic, Social, and Style Data

Several other types of data may be collected such as, but not limited to the demographics of the user, the user's pupillary distance (PD), the user's past purchasing history, the users past social activity, social connections, social engagement, other social data, or social networking data. In addition data related to the user's personality may be included, such as data obtained from the user in response to questions or stimuli, such as sound, images, or videos, presented to the user through the user engagement system. These questions may relate to at least any of the following: the product, the product category, the users preferences within other categories, the user's viewpoint on various topics, the user's psychological profile, the user's preference for stylists, which may be obtained from the user in response to questions or stimuli, such as sound, images, or videos, related to stylists or the styles of stylists presented to the user through the user engagement system. The user's preference for stylists may be obtained from the user's online interaction with stylists, where that online interaction data is provided directly by the user to the User System or by the stylist to the User System with permission from the user. The user's online activity or browsing history may also be used which may relate to the user engagement system itself or it may relate to online activity or browsing history separate from the user engagement system. Online activity or browsing history may relate to the product or product category or to other online activity or browsing history. The additional user data provided by the user may be stored on, or accessible through, the user's personal electronic device. The additional user data provided by the user may be stored on, or accessible through, other systems, networks, applications, interfaces, or platforms. Access to additional user data may be permissioned and provided explicitly by the user or implicitly through a set of separate permissions and provisions provided by the user.

Personal Product Preference Model

The Learned Knowledge System is used to train a Personal Product Preference Model, which is a model that may predict the user's style, using any machine learning architecture, such as a random forest over a feature vector and a database of user or individual preference ratings, where that database of user or individual preference ratings is a database of user or individual preference classifications indicating whether a user or individual likes or does not like a particular frame, a type of frame, a class of frames, a frame grouping or a frame component, or indicating a rating level on the degree to which a user or individual likes or does not like a particular frame, a type of frame, a class of frames, a frame grouping or a frame component where that degree may be established on a 3 point classification scale or a 5 point classification scale.

One exemplary type of user data is data on user preferences on types of products they prefer (a particular product, a type of product, a class of product, a product grouping, or an individual component of a product), ratings on said products, ratings on products displayed to the user as part of this invention. Embodiments may display a product using a still image, video, or by other means.

This collection and storage of preference data may take place also within or be shared by the Knowledge System as well as in the User System. The User Engagement System may also provide users with instructions and a mechanism to indicate that they do not wish to provide any or further user preference data.

The feature vector used by the Personal Product Preference Model may contain any of the following individually or in combination as illustrated in FIG. 13 and listed in Table 2: Shape features of the eyeglass frame, Color features, the Fit & Size features, or any combination thereof. The feature vector used by the Personal Product Preference Model may be a Combined Feature Vector containing features of the frame and of the user's face or of an individual providing the ratings, or it may be a Combined Shape Feature Vector, a Combined Color Feature Vector, a Combined Fit & Size Feature Vector, or any combination of the Combined Shape Feature Vector, the Combined Color Feature Vector, and the Combined Fit & Size Feature Vector. The feature vector used by the Personal Product Preference Model may be a Combined Deep Feature Vector. The feature vector used by the Personal Product Preference Model may be any Combined Feature Vector.

The Personal Product Preference Model may be a model or set of models that may be trained in real time using any machine learning architecture, such as a random forest over a feature vector, such as the feature vectors used by the Learned Knowledge System to train a Personal Product Preference Model, using the user preference data captured within the User System. The Personal Product Preference Model may be a model that may be trained in real time using an online learning approach or an adaptive learning approach or both. In one embodiment system 404 sends instructions to the user engagement system on any information pertaining to the eyeglass frame (e.g. type of frame, class of frames, frame grouping, frame component, or the like) to present to the user for the user to provide their preference classification on whether the user likes or does not like that frame, that type of frame, or the information pertaining to the frame. In one embodiment, the frame information is presented to the user for the user to provide their preference classification. This classification is determined through an adaptive learning process that uses a heuristic that takes into account the user's preference classification on all prior information presented. This heuristic may be based on the classification confidence of the previous training state of the model for each individual frame, type of frame, class of frames, frame grouping or frame component. The Personal Product Preference Model may be trained in real time and may have a termination point. In one embodiment this termination point may be established by limiting the number of iterations of user feedback on type of frames, classes of frames, frame groupings or frame component presented to the user to a specified number of iterations. In one embodiment this number of iterations may be 50. In one embodiment this termination point may be established by the user by indicating they no longer wish to provide more feedback. In one embodiment this termination may be established by comparing the set of the top n recommended frames from the serving of the Personal Product Preference Model in the Recommendation (Reco) Serving System between iterations and establishing rules to determine when the recommendations are sufficiently stable across iterations. These rules may be defined such that if there is less than 5% difference in the top n recommended frames between each iteration or set of iterations then the model is stable.

In embodiments, this system may serve a Personal Product Preference Model, which may be trained to predict the user's preference classification for frames within the Product System. The Personal Product Preference Model may be a machine learning model that uses a feature vector and the user preference classification data for frames. This data may include whether the user likes or does not like a particular frame, a type of frame, a class of frames, a frame grouping or a frame component, or indicate a rating level on the degree to which the user likes or does not like such items. The degree to which the user likes or dislikes a frame may be established on a point classification scale such as a 3 point or a 5 point classification scale.

The feature vectors which may be used by the Personal Product Preference Model may comprise those described earlier such as the Shape, Color, and Fit & Size. These vectors may also comprise those containing any of the features of the frame that are listed in Table 2, and which correspond to the landmarks shown in FIG. 13 a or a combined vector combining features of the face and the frame. The feature vectors may further comprise a Combined Feature Vector, a Combined Shape Feature Vector, a Combined Color Feature Vector, a Combined Fit & Size Feature Vector, a Combined Deep Feature Vector, a Combined Feature Vector, or any combination thereof.

The Personal Product Preference Model may be a model that is trained in real time within the Knowledge System using the user preference data captured earlier to predict the user's preference classification for frames within the Product System. The Personal Product Preference Model may be a model that is trained using approaches such as an online learning approach, an adaptive learning approach, or a combination of these. The model may retrieve data on which frame, type of frame, class of frames, frame grouping or frame component (henceforth "frame information") to present to the user for the user to provide their preference classification on whether the user likes or does not like of the frame information or certain parts of the frame information. The frame information may be presented to the user for the user to provide their preference classification. This preference may be determined through an adaptive learning process that uses a heuristic that takes into account the user's preference classification on all prior frame information presented to the user. This heuristic may be based on the classification confidence of the previous training state of the model for each piece of frame information.

Population Affinity Model and Stylist Affinity Model.

A Population Affinity Model may be created to classify/categorize the user amongst the general population and a Stylist Affinity Model may be created to predict the preference classification of the user for a particular Stylist, or the style of a particular Stylist.

The social data or social milieu data processing system may serve a Population Affinity Model to predict the classification of the user within a set of defined population or customer segments based upon the user data. In addition, the social milieu data processing system may serve a Stylist Affinity Model to predict affinity for a defined stylist category or classification. These models—the Population Affinity Model and the Stylist Affinity Model—may be trained within the Learned Knowledge System, uses a machine learning architecture, such as a random forest over user data stored by the user data collection and storage system which may include user preference data, user demographic data, user past purchasing history, user past social activity, social connections, social engagement and social data, user personality data, user stylist preference data, user online activity or browsing history data, or any other data captured by the User System, to predict the classification of the user within a set of defined population or customer segments. In one embodiment demographic data, such as age, gender and ethnicity may also be estimated by using the Face Attribute Model, trained in the Learned Knowledge System. In another embodiment other demographic data may be obtained through other means. In one embodiment past purchasing data, online activity or browsing data may be obtained directly by user interaction with the User System. In one embodiment demographic, personality, psychological or social data may be obtained directly by user interaction with the User System. In one embodiment demographic data, personality or psychological data, social data, past purchasing data, online activity or browsing data may be obtained from $3^{rd}$ party databases or platforms. The various embodiments of the Population Affinity Model and the Stylist Affinity Model may be used solely or in combination within one another or with other elements of this system.

The social milieu data processing system processes data to calculate a user's social milieu profile. An exemplary social profile relates to a user's connection with a particular network of individuals or social community. Another exemplary social profile relates to a user's engagement with a particular network of individuals or social community.

The social milieu data processing system processes data to calculate a user's personality or psychological profile.

The processing of user data may be performed entirely within this User System. In another, the processing or sub-processing of parts or all of the user data may be performed within a separate Product System, Knowledge System or Recommendation Serving System. In another embodiment the processing or sub-processing of parts or all of the user data may be performed within another system or set of systems, which may include, but is not limited to social networking platforms, social communication platforms, community engagement platforms, commercial platforms, or other personal platforms. The user data may be processed along with other data from other systems.

Affinity and Preference Models

The Population Product Affinity Model may be a machine learning model that predicts the user's preference classification for a frame using the user's predicted population affinity classification from the Population Affinity Model. In embodiments, this system may serve a Stylist Predicted Style algorithm, which may be an algorithm that predicts the user's preference classification for a frame using the user's predicted stylist affinity classification from the Stylist Affinity Model. An Overall Style Model may be a system used to weight the predicted preference classification from alternative predicted preference classification systems to create an overall predicted preference classification for a user for individual products. A predicted preference classification system may be a Personal Product Preference Model, a Population Product Affinity Model, a Stylist Predicted Style Model, a Stylist Product Affinity Model, or some other model.

Population Product Affinity

The Learned Knowledge System is used to train a Population Product Affinity Model using a machine learning model that predicts the user's preference classification for a frame using the user's predicted population affinity classification from the Population Affinity Model in User System and the product preferences for population or customer segments, where these product preferences for population or customer segments are established through a machine learning model, such as a random forest over user data such as preference data, user demographic data, user past purchasing history, user past social activity, social connections, social engagement and social data, user personality data, user stylist preference data, user online activity or browsing history data, or any other data. The Learned Knowledge System is used to store a Population Product Affinity Model. In one embodiment, the Population Product Affinity Model is served by the Knowledge System. In another embodiment, the Population Product Affinity Model is served by the Recommendation Serving System.

Stylist Predicted Style

The Learned Knowledge System is used to develop a Stylist Predicted Style algorithm to predict the user's preference classification for a frame. In one embodiment this algorithm utilizes a weighting system using the user's predicted stylist affinity classification from the Stylist Affinity Model in User System as a weight against the predicted product preference classification of individual stylists to establish an overall predicted product preference classification for the user. The predicted product preference classification of individual stylists is obtained using a Personal Product Preference Model where the model has been trained on an individual stylist's preference classifications rather than a user's preference classification. The stylist's preference classification is a preference classification indicating whether the stylist likes or does not like a particular frame, a type of frame, a class of frames, a frame grouping or a frame component, or indicating a rating level on the degree to which the stylist likes or does not like a particular frame, a type of frame, a class of frames, a frame grouping or a frame component where that degree may be established on a point classification scale. The stylist's preference classification may be obtained through a process similar to the process used to obtain the user's preference classification. The stylist's preference classification may be obtained through a separate process or application specific to obtaining a stylist's preference classification. The Stylist Predicted Style algorithm is served by the Recommendation Serving System. In another embodiment the Stylist Predicted Style algorithm may be served by the Knowledge System.

Overall Style Model

The Learned Knowledge System may be used to develop or train an Overall Style Model. The Learned Knowledge System may be used to store an Overall Style Model. In one embodiment an Overall Style Model is an algorithm to predict the user's preference classification for a frame from a number of alternative predicted preference classification systems. A predicted preference classification system may comprise a Personal Product Preference Model, a Population Product Affinity Model, a Stylist Predicted Style algorithm, or any other model. This Overall Style Model is a system used to weight the predicted preference classification from alternative predicted preference classification systems to create an overall predicted preference classification for a user for individual products.

The weighting system used by the Overall Style Model is a weighting system where the weighting is defined at the individual predicted preference classification system level, and then applied to all the products within the individual predicted preference classification system, but where the weighting can be different across the individual predicted preference classification systems. In another embodiment the weighting system used by the Overall Style Model is a weighting system where the weighting is defined at the product level, and not at the individual predicted preference classification system level, so that the weights applied to individual products within the same individual predicted preference classification system may differ. The preference classifications used by the individual predicted preference classification systems may be the same or the preference classifications used by the individual predicted preference classification systems may be different.

Style Overlay Model

The Learned Knowledge System may be used to develop and train and store a Style Overlay Model. In one embodiment a Style Overlay Model is an algorithm for developing an overall rating or recommendation score for an individual product for an individual user by incorporating the output of both the Score Prediction Model and the Overall Style Model. In one embodiment this model uses a weighting system, developed by the Learned Knowledge System to weight the output of the Score Prediction Model against the predicted product preference classification from the Overall Style Model. In one embodiment this model uses a weighting system to weight the output of the individual predictors from the Predictor Models in the Score Prediction Model against the weight of the predicted product preference classification from the Overall Style Model. The Style Overlay model uses the overall predicted preference classification for an individual product for an individual user from the Overall Style Model to adjust the rating or recommendation score from the Score Prediction Model for an individual product for an individual user. The Style Overlay Model uses a thresholding on the overall predicted preference classification for an individual product for an individual user from the Overall Style Model to adjust the rating or recommendation score for an individual product for an individual user from the Score Prediction Model.

Recommending System

In one embodiment a Relative Face: Frame Feature Extractor is executed by the Reco System to calculate Relative Face: Frame Features to be used within the Knowledge System or the Serving System. One embodiment of a Relative Face: Frame Feature Extractor is a Canonical Relative Face: Frame Feature Extractor developed within the Learned Knowledge System to extract hand-engineered Relative Face: Frame Features from a set of calculations performed on the set of face landmarks in a canonical space received from the User Physical Data Processing System and the set of frame landmarks in a canonical space and pose received from the Product Physical Data Processing System. One embodiment of a set of hand-engineered relative face: frame features calculated by a Canonical Relative Face: Frame Feature Extractor is shown in Table 3.

Figure 15:
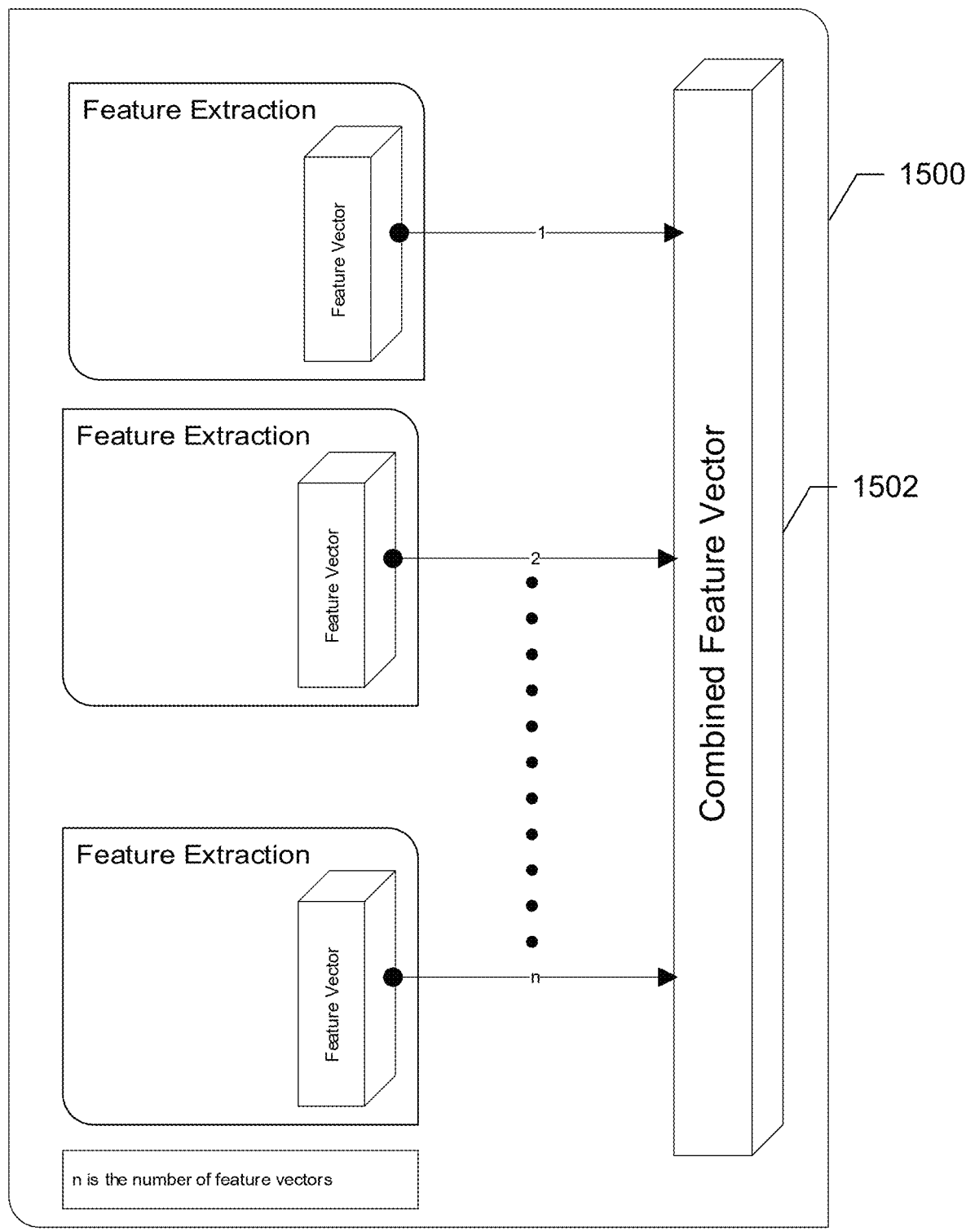
FIG. 15 illustrates a Feature Extraction and Combination process

As shown in FIG. 15, the reco input system may perform a feature extraction and combination process 1500 to combine features it receives from various systems to create a Combined Feature Vector 1502 through a process of differentiation, concatenation, or some other approach. For instance, this system may combine the hand engineered face features calculated by the Canonical Face Feature Extractor (as shown in FIG. 11 and listed in Table 1) with the hand engineered frame features calculated by the Canonical Frame Feature Extractor (shown in FIG. 13 and listed in Table 2) to create a Combined Feature Vector. Similarly with other hand engineered aspect of faces and frames such as Shape (Combined Shape Feature Vector), Color (combined Color Feature Vector), Relative Face: Frame Feature (Combined Relative Face: Frame Feature Vector from the Canonical Relative Face: Frame Feature Extractor), and a Combined Fit & Size Feature Vector (shown in Table 3). In a similar manner a Combined Deep Feature Vector may be created based on the Deep Face Feature Extractor and the Deep Frame Feature Extractor as shown in FIGS. 12 and 14

Figure 16:
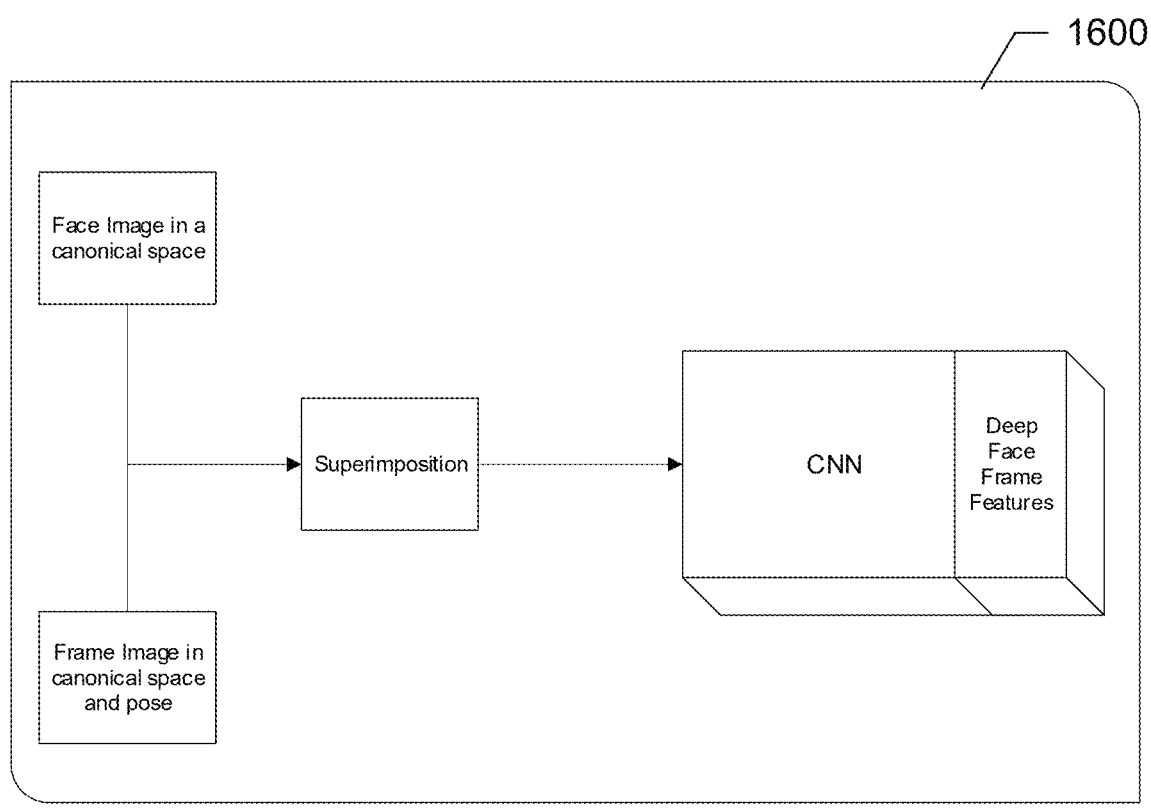
FIG. 16 illustrates a Single Path Deep Feature Generation Model

As illustrated in FIG. 16, the system may superimpose face images from a canonical space (for instance, from the User Physical Data Processing System) and frame images from a canonical space (for instance from the Product Physical Data Processing System) to create a combined image, and serves a deep learning model, such as a Single Path Deep Feature Generation model 1600 trained within the Learned Knowledge System, illustrated in FIG. 16, to extract deep face: frame features from the combined image to create a Combined Deep Feature Vector The reco input system may combine hand engineered features from one system with deep features from another system to create a Combined Feature Vector. The Reco Input System may receive trained models from the Knowledge System through any computer services or inter-system communications. The various embodiments of the reco input system may be used either solely or in combination with one another. The data within the reco input system may be shared with the Serving System through direct access to those systems, or through any computer services or inter-process communications (IPC) such as shared memory and message passing, remote procedure calls (RPC), or through any other means that allow the reco input system to transfer data to the serving system.

The recommendation serving system receives trained models from the Knowledge System through any computer services. The Serving System serves a Score Prediction Model trained within the Learned Knowledge System on data from the Reco Input System. The Score Prediction Model output is a predicted expert rating score for individual eyeglass frames for a particular individual. This rating score may be used as an expert recommendation score for eyeglass frames for individual users whose image data has been shared. The Score Prediction Model is a machine learning classification model, trained within a sub-system, that outputs an overall expert rating score ranging, for instance, from 1 to 5, where the overall rating score represents the rating class with the highest confidence. The Score Prediction Model, may be a machine learning regression model, trained within the Learned Knowledge System, that may output an overall expert rating score. Such a rating score may be, for instance, a real number ranging from 1 to 5. These individual eyeglass frames have data within the Recommendation System and product data within the Product System and that are available for purchase from the Recommendation Purchasing System. The users are the ones of record whose data and interactions with the other systems have already been recorded. They have an image or set of images identified by the smart image selector of system as meeting or best meeting the input requirements for additional data processing and analysis within the Recommendation Serving System.

Score Prediction Model

The Score Prediction Model may be an End-to-end Score Prediction Model, trained within the Learned Knowledge System, utilizing the Combined Feature Vector developed within the Reco Input System. This Combined Feature Vector may comprise a Combined Fit & Size Feature Vector, a Combined Shape Feature Vector, a Combined Color Feature Vector or a Combined Deep Feature Vector or a combination thereof.

In another embodiment the Score Prediction Model may be a trained model that utilizes the output of a set of trained Predictor Models. Predictors are characteristics that impact how well a particular frame suits a particular individual. These predictors can be aggregated into categories of predictors. One embodiment of a categorized set of predictors is shown in Table 4. These categories of predictors are categories that may be commonly used by opticians or experts in the optical domain to evaluate the suitability of a particular frame for a particular user or to determine whether or not to recommend a particular frame to a particular user. These categories of characteristics include the size, shape, fit and color of the frame in relation to the face of an individual. In one embodiment size predictors relate to the recommended suitability of the size or measurement of certain components of the product in relation to the size or measurement of certain physical or anatomical components of the user. An example of a size predictor is the recommended suitability of the width of certain elements of the product in relation to the width of the user's face taken at certain defined locations. In one embodiment fit predictors relate to the recommended suitability of the fit of certain components of the product in relation to certain physical or anatomical components of the user. An example of a fit predictor is the recommended fit suitability of the bridge of a pair of eyeglasses in relation to the nose bridge of a user. In one embodiment shape predictors relate to the recommended suitability of the shape of certain components of the product in relation to certain physical or anatomical components of the user. An example of a shape predictor is the recommended suitability of the shape of certain elements of the frame in relation to the shape of the user's face or facial features at certain defined locations. These shape predictors may be scale invariant or scale variant. Color predictors may relate to the recommended suitability of certain color elements of the product in relation to certain color elements of certain physical or anatomical components of the user. In one embodiment an optician or expert in the optical domain might assign one of a number of alternative values or classes to individual predictors based on their expert knowledge.

One embodiment of these alternative values or classes for each predictor is shown in Table 5. The Recommendation Serving System serves Predictor Models, trained within the Learned Knowledge System over a Combined Feature Vector received from the Reco Input System. The Predictor Models served by the Recommendation Serving System may comprise a Random Forest, other machine learning algorithms or architectures. The individual Predictor Models for predictors within the Fit or Size, Shape, Color, or Combined Deep Feature categories, as listed in Table 4, are served the like named vectors (e.g. the Shape category may be served by the Combined Shape Feature Vector; the Fit & Size by the combined Fit & Size Feature Vector, etc.)

In another embodiment the Score Prediction Model served by the Recommendation System is a model, trained within the Learned Knowledge System, that utilizes a Refinement Model. The Score Prediction Model served by the Recommendation System utilizing the Refinement Model utilizes as an input one or more combined feature vectors developed within the Reco Input System A Score Prediction Model that utilizes Predictor Models to develop rating or recommendation scores may be a Formula Based Score Calculation. This Formula Based Score Calculation may use confidence scores generated by each Predictor Model for the individual alternative classes within each Predictor Model, along with a weighting system for these classes to come up with an overall rating or recommendation score for a particular frame for a particular user.

Overall Style Model Weighting

The weighting system used by the Overall Style Model, which may be served by this system, may be defined at the individual predicted preference classification system level, and then applied to all the products within that system, but where the weighting can be different across the systems. The weighting system used by the Overall Style Model may be defined at the product level, and not at the individual predicted preference classification system level, so that the weights applied to individual products within the same individual predicted preference classification system may differ. The preference classifications used by the individual predicted preference classification systems may be the same or they may be different.

Why Recommend Model

The Learned Knowledge System may be used to develop and train a Why Recommend Model. A Why Recommend Model algorithm may be used to generate an explanation or reasoning for the rating or recommendation score for an individual product for the user. The Why Recommend Model may utilize data within the Reco (Recommendation) Input System or the output of a model such as the Score Prediction Model, any Predictor Models, the Overall Style Model, the Style Overlay Model, or any combinations thereof. This system may match explanatory words or symbols to the output of the Why Recommend Model. A Why Recommend Model may aggregate the output of the Predictor Models across categories of predictors into an overall score or rating for that category of predictors. The score or rating for that category of predictors may be translated into words or symbols through a system that matches explanatory words or symbols to the output of the Why Recommend Model. In one embodiment a Why Recommend Model aggregates the output of the Predictor Models across categories of predictors into a confidence for a score or rating for that category of predictors. In one embodiment that confidence for a score or rating for that category of predictors is translated into words or symbols through a system that matches explanatory words or symbols to the output of the Why Recommend Model.

Figure 22:
FIG. 22 illustrates an embodiment of the explanation or reasoning for recommending a product
Figure 22:
Figure 22:
Figure 22:
Figure 22:
Figure 22:

The Serving System serves a Why Recommend Model on the data in the Recommendation Serving System to generate an explanation or reasoning for the rating or recommendation score for an individual product for the user. Details about this model were given above. The Why Recommend Model may be based on a machine learning algorithm and architecture. The Recommendation Display System displays the outputs of the Why Recommend Model: overall score or rating for that category of predictors, explanatory words or symbols, and a confidence for a score or rating for that category of predictors, or combinations thereof. One example is illustrated in FIG. 22.

The Why Recommend Model may include calculations that utilize the Face Features of the user and the Frame Features of the product to generate an explanation or reasoning for the rating or recommendation score for an individual product for the individual user. The Face Features of the user are compared to the Face Features of other users to establish the relative measurements of the Face Features of an individual user compared to the distribution of measurements of the Face Features of other users. The Frame Features of the product are compared to the Frame Features of other products to establish the relative measurements of the Frame Features of an individual product compared to the distribution of measurements of the Frame Features of other product. The relative measurements of the Face Features of the individual user and the relative measurement of the Frame Features of the individual frames are used in connection with the predictors to generate an explanation or reasoning for the rating or recommendation score of an individual product for the user. As an example, the explanation or reasoning for the rating or recommendation score for an individual product for an individual user that has a predicted value of 'proper width' for the predictor 'frame width' in Table 5 can utilize as part of the explanation or reasoning that a particular Face Feature measurement of the user has the same statistical positioning relative to the Face Feature measurement of other users, such as narrower than average, as a particular Frame Feature measurement of the product has relative to the Frame Feature measurement of other products, such as narrower than average. In one embodiment relative measurements of the Face Features of the individual user and the relative measurement of the Frame Features of the individual frames is translated into words or symbols. The Learned Knowledge System may be used to store a Why Recommend Model.

User Summary Model

The Learned Knowledge System may be used to train a User Summary Model, which in one embodiment is a machine learning model and in another embodiment is an algorithm, to generate a summary explanation for the types of products, class of product, product grouping or collections of products that are most highly recommended for the user. The User Summary Model uses the output of the Score Prediction Model, the Predictor Models, the Overall Style Model, the Style Overlay Model, and various combinations thereof. The User Summary Model may comprise a statistical analysis. A User Summary Model may calculate a histogram over the product attribute data of the product or frames with a rating or recommendation score above a certain threshold to identify the types of products, class of product, product grouping, product attributes or collections of products that are most highly recommended for the user. Additional statistical outlier analysis using a z-score may also be performed. A system to match explanatory words or symbols to the output of the User Summary Model may also be used.

The Serving System serves a User Summary Model on the data in the Recommendation Serving System to generate a summary explanation for the types of products, class of product, product grouping or collections of products that are most highly recommended for the user.

The serving system transfers the rating or recommendation score for the recommendation suitability of each individual product across a set of products for a specific user to the Recommendation Display System through any computer services or communications. The serving system also uses trained models from the Knowledge System to create a personalized design or set of designs for a product or a set of products where those products would achieve a high recommendation suitability score for the user.

Recommendation Display

Figure 21:
FIG. 21 illustrates a recommended product shown superimposed onto an image of the user

Recommendations may include symbols, pictures, pictures of the product rendered or super-imposed on another object (such as a user's face), an example of which is shown in FIG. 21, words, ratings (or individual components or overall), scores of individual components, overall scores, and the like. These may include the explanation or reasoning for the recommendation and are illustrated in FIG. 22. The explanation or reasoning for recommending a product may displayed as a list of reasons. A confidence score for each reason may also be displayed. The confidence score for each reason may be displayed using a grouping system where different confidence scores are grouped together and displayed using symbols. The method for showing a recommended product may include a set of symbols to denote recommended product based on the recommended score from various combinations of the Score Prediction Model, Predictor Models, Overall Style Model or Style Overlay Model.

Figure 23:
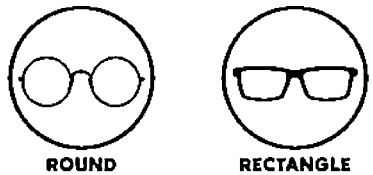
FIG. 23 illustrates an embodiment of a User Summary
Figure 23:
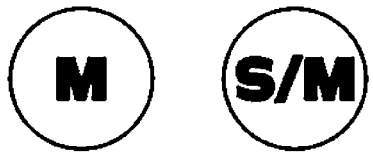
Figure 23:
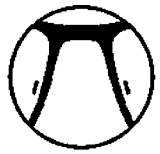

An exemplary block diagram of a Recommendation Display System 600 is shown in FIG. 6. In another embodiment the recommendation display user interaction system 602 may group products, whose rating or recommendation score from the Style Overlay Model, the Overall Style Model, or the Score Predictor Model, or combinations thereof falls within a particular range. Products may be grouped based on one or a set of predictors used within the Recommendation Serving Engine. For instance those products whose rating or recommendation scores may fall within a particular range may be assigned into groupings related to one or a set of facial features or a set of product features. The recommendation display user interaction system 602 may provide generalized recommendations to the user where these generalized recommendations indicate product features that lead to a higher product rating or higher recommendation scores for the user given the user's facial features. The recommendation display user interaction system may direct the user to shopping categories that contain a quantity of product with rating or recommendation scores above a certain threshold. The recommendation display user interaction system may display a summary explanation, generated by the User Summary Model, for the types of products, product attributes or collections of products that are most highly recommended for the user. One embodiment of a summary is illustrated in FIG. 23.

The displayed recommendations may include a list of recommended products or it may include pre-populating a shopping area, such as a recommendation area, containing the recommended product or it may include pre-populating a shopping cart containing the recommended product. The recommendation display user interaction system may include showing a personalized design or set of designs for a product or a set of products where those products would achieve a high recommendation suitability score for the user.

Within the Recommendation Display System various pieces of information may be displayed. The types of products, class of product, product grouping, product attributes or collections of products that are most highly recommended for the user may be displayed. The explanation or reasoning for the highly recommended product for the user may be displayed. The explanatory words or symbols matched to the output of the User Summary Model may be displayed. One example is illustrated in FIG. 23.

Purchasing System

In one embodiment the product ordering and purchasing system may be an online store, e-commerce website, or other online platform that enables product ordering and purchasing. Examples of an online platform that enables product ordering and purchasing include Google Shopping, Facebook, and Instagram. The product ordering and purchasing system may be an online advertising network or an affiliate network. The product ordering and purchasing system may be an influencer, an influencer's social platform, an influencer's network platform, or some other platform that allows users to purchase from influencers. In another embodiment the product ordering and purchasing system may be a physical store, a digital interface related to a physical store, a kiosk, or a call center.

The product fulfillment system may be a physical store. In another embodiment the product fulfillment system may be a process where the product is shipped to a user or shipped to a physical location to be collected by the user. The product fulfillment system may be a process where the product is made available to the user from a product inventory. In another embodiment the product fulfillment system may be a process where the product is made available to the user from a product supply chain inventory or manufacturing supply chain. In another embodiment the product fulfillment system may be a process where the product is created on demand for the user. In another embodiment the product fulfillment system may be a process where the product is created on demand by the user. In another embodiment the product fulfillment system may be a process where the product is provided to the user as a product design. In another embodiment the product fulfillment system may be a process where the product is created by the user using product designs provided to the user. In another embodiment the product is made available to the user in parts. In another embodiment the product is made available to the user in combination with other related elements or components. In various embodiments the product made available to users may be a pair of eyeglasses without lenses (frames only), eyeglasses with a non-prescription lens, eyeglasses with a prescription lens, a pair of sunglasses with no lenses (frames only), sunglasses with a non-prescription plano lens, or sunglasses with a prescription lens.

These various embodiments of a product fulfillment system can utilize various methods for fulfilling product purchases.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for image analysis, the system comprising a processor, memory accessible by the processor, and computer program instructions stored in the memory and executable by the processor to perform:
    obtaining an image of a face or head of a person;
    generating face features from the image of the face or head of the person;
    retrieving a plurality of object features of a plurality of objects from a database of object features of the plurality of objects, wherein the plurality of objects comprises products purchasable by a user, and wherein the database of object features comprises parameters computed based on physical properties of the plurality of objects;
    generating a plurality of combined face and object features from the face features and the plurality of object features;
    generating a ranking of combined face and object features, wherein generating the ranking comprises generating a ranking of object fit relative to the face features based on the plurality of combined face and object features;
    receiving a preference classification from the person, wherein the preference classification comprises real-time iterative feedback relating to the plurality of object features, wherein the preference classification is determined through an adaptive learning process that uses a heuristic that takes into account preference classification information received from the person on all prior object feature information presented to the person relating to the plurality of object features, and wherein the heuristic is based on a classification confidence of a previous training state of the adaptive learning process for one or more individual object features of the plurality of objects;
    selecting at least one object based on the ranking of combined face and object features and the preference classification;
    generating an interactive display of the selected at least one object to the person; and
    providing user interaction of the interactive display to provide purchase of the selected object.

2. The system of claim 1, further comprising determining a scale of the image using an object or indicia of known dimensions present in the image.

3. The system of claim 1, wherein generating the ranking comprises evaluating the combined face and object features relative to expert ratings.

4. The system of claim 3, further comprising:
    extracting face landmarks from the image of the face or head of the person; and
    generating face features from the image of the face or head of the person based on the extracted face landmarks.

5. The system of claim 4, wherein the face landmarks comprise locations and arrangements of anatomical features of the face or head of the person.

6. The system of claim 5, wherein the physical properties of the plurality of objects include object landmarks that comprise locations and arrangements of components of the object and locations and arrangements of points on the object.

7. The system of claim 6, wherein generating the ranking comprises using features created from hand engineered relative face and object features related to at least one of:
   a relative distance of the eye of the user and a contour of the object when in a same coordinate system;
   a relative distance of a contour of the person's face and a contour of the object when in a same coordinate system; and
   a relative distance between an eye of the person and coordinates of a portion of the object when in a same coordinate system.

8. The system of claim 7, wherein the features are used to infer classes of intermediate features related to object size-width relative to the face of the person.

9. The system of claim 7, wherein the features are used to infer classes of intermediate features related to object size-height relative to the face of the person.

10. The system of claim 7, wherein the features are used to infer classes of intermediate features related to object fit relative to the face of the person.

11. The system of claim 7, wherein generating the ranking comprises using predictor models to generate the ranking based on features.

12. The system of claim 3, wherein generating the ranking comprises using features created by extracting combined face and object features.

13. The system of claim 12, wherein generating the face features comprises extracting face features using deep learning models and image analysis.

14. The system of claim 12, wherein the features are used to infer classes of intermediate features related to object size-width relative to the face of the person.

15. The system of claim 12, wherein the features are used to infer classes of intermediate features related to object size-height relative to the face of the person.

16. The system of claim 12, wherein the features are used to infer classes of intermediate features related to object fit relative to the face of the person.

17. The system of claim 12, wherein generating the ranking comprises using predictor models to generate the ranking based on features.

18. The system of claim 12, wherein the features of the plurality of objects are generated by extracting object features using deep learning models.

19. A system for image analysis to evaluate suitability of an eyewear product or a set of eyewear products for a person, the system comprising a processor, memory accessible by the processor, and computer program instructions stored in the memory and executable by the processor to perform:
   obtaining an image of a face or head of the person;
   generating face features from the image of the face or head of the person;
   retrieving a plurality of eyewear product features of a plurality of eyewear products from a database of eyewear product features of the plurality of eyewear products, wherein the plurality of eyewear products comprises pre-fabricated eyewear products purchasable by a user, and wherein the database of eyewear product features comprises parameters computed based on physical properties of the plurality of eyewear products;
   generating a plurality of combined face and eyewear product features from the face features and the eyewear product features;
   generating a ranking of combined face and eyewear product features, wherein generating the ranking comprises generating a ranking of eyewear product fit relative to the face features based on the plurality of combined face and eyewear product features;
   receiving a preference classification from the person, wherein the preference classification comprises real time iterative feedback relating to the plurality of object features, wherein the preference classification is determined through an adaptive learning process that uses a heuristic that takes into account preference classification information received from the person on all prior eyewear product feature information presented to the person relating to the eyewear product features, and wherein the heuristic is based on a classification confidence of a previous training state of the adaptive learning process for one or more individual eyewear product features of the plurality of eyewear products;
   selecting at least one eyewear product based on the ranking of combined face and eyewear product features and the preference classification;
   generating an interactive display of the selected at least one eyewear product to the person; and
   providing user interaction of the interactive display to provide purchase of the selected eyewear product.

20. The system of claim 19, further comprising determining a scale of the image using an object or indicia of known dimensions present in the image.

21. The system of claim 19, wherein generating the ranking comprises evaluating the combined face and eyewear product features relative to expert ratings.

22. The system of claim 21, further comprising:
   extracting face landmarks from the image of the face or head of the person; and
   generating face features from the image of the face or head of the person based on the extracted face landmarks.

23. The system of claim 22, wherein the face landmarks comprise locations and arrangements of anatomical features of the face or head of the person.

24. The system of claim 23, wherein the physical properties of the plurality of eyewear products include eyewear product landmarks that comprise locations and arrangements of components of the eyewear product and locations and arrangements of points on the eyewear product.

25. The system of claim 24, wherein generating the ranking comprises using features created from hand engineered relative face and eyewear product features related to at least one of:
   a relative distance of the eye of the user and a contour of the eyewear product when in a same coordinate system;
   a relative distance of a contour of the person's face and a contour of the eyewear product when in a same coordinate system; and
   a relative distance between an eye of the person and coordinates of a lens of the eyewear product when in a same coordinate system.

26. The system of claim 25, wherein the features are used to infer classes of intermediate features related to eyewear product size-width relative to the face of the person.

27. The system of claim 21, wherein the features are used to infer classes of intermediate features related to eyewear product size-height relative to the face of the person.

28. The system of claim 25, wherein the features are used to infer classes of intermediate features related to eyewear product fit relative to the face of the person.

29. The system of claim 25, wherein generating the ranking comprises using predictor models to generate the ranking based on features.

30. The system of claim 21, wherein generating the ranking comprises using features created by extracting combined face and eyewear product features.

31. The system of claim 30, wherein generating the face features comprises extracting face features using deep learning models and image analysis.

32. The system of claim 30, wherein the features are used to infer classes of intermediate features related to eyewear product size-width relative to the face of the person.

33. The system of claim 30, wherein the features are used to infer classes of intermediate features related to eyewear product size-height relative to the face of the person.

34. The system of claim 30, wherein the features are used to infer classes of intermediate features related to eyewear product fit relative to the face of the person.

35. The system of claim 30, wherein generating the ranking comprises using predictor models to generate the ranking based on features.

36. The system of claim 30, wherein the features of the plurality of eyewear products are generated by extracting eyewear product features using deep learning models.

37. A system for image analysis to evaluate suitability for a person of an eyewear product or a set of eyewear products incorporating stylistic preferences, the system comprising a processor, memory accessible by the processor, and computer program instructions stored in the memory and executable by the processor to perform:
   obtaining an image of a face or head of a person;
   generating face features from the image of the face or head of the person;
   retrieving a plurality of eyewear product features of a plurality of eyewear products from a database of eyewear product features of the plurality of eyewear products, wherein the plurality of eyewear products comprises pre-fabricated eyewear products purchasable by a user, and wherein the database of eyewear product features comprises parameters computed based on physical properties of the plurality of eyewear products;
   generating a plurality of combined face and eyewear product features from the face features and the plurality of eyewear product features;
   generating a ranking of combined face and eyewear product features based on stylistic preferences of the person or another person, expert ratings of the eyewear products and eyewear product fit relative to the face features based on the plurality of combined face and eyewear product features;
   receiving a preference classification from the person, wherein the preference classification comprises real time iterative feedback relating to the plurality of eyewear product features, wherein the preference classification is determined through an adaptive learning process that uses a heuristic that takes into account preference classification information received from the person on all prior eyewear product feature information presented to the person relating to the plurality of eyewear product features, and wherein the heuristic is based on a classification confidence of a previous training state of the adaptive learning process for one or more individual eyewear product features of the plurality of eyewear products;
   selecting at least one eyewear product based on the ranking of combined face and eyewear product features and the preference classification;
   generating an interactive display of the selected at least one eyewear product to the person; and
   providing user interaction of the interactive display to provide purchase of the selected eyewear product.

38. The system of claim 37, further comprising determining a scale of the image using an object or indicia of known dimensions present in the image.

39. The system of claim 37, wherein generating the ranking comprises evaluating the combined face and eyewear product features relative to expert ratings.

40. The system of claim 39, further comprising:
   extracting face landmarks from the image of the face or head of the person; and
   generating face features from the image of the face or head of the person based on the extracted face landmarks.

41. The system of claim 40, wherein the face landmarks comprise locations and arrangements of anatomical features of the face or head of the person.

42. The system of claim 41, wherein the physical properties of the plurality of eyewear products include eyewear product landmarks that comprise locations and arrangements of components of the eyewear product and locations and arrangements of points on the eyewear product.

43. The system of claim 42, further comprising obtaining stylistic preference feedback on a plurality of eyewear products.

44. The system of claim 43, further comprising learning user stylistic preferences on features of a plurality of eyewear product using parameters computed based on eyewear product features.

45. The system of claim 43, further comprising the ranking and evaluation of combined face and eyewear product features relative to expert ratings adjusted for user stylistic preferences.

46. The system of claim 42, wherein generating the ranking comprises using features created from hand engineered relative face and eyewear product features related to at least one of:
   a relative distance of the eye of the user and a contour of the eyewear product when in a same coordinate system;
   a relative distance of a contour of the person's face and a contour of the eyewear product when in a same coordinate system; and
   a relative distance between an eye of the person and coordinates of a lens of the eyewear product when in a same coordinate system.

47. The system of claim 46, wherein the features are used to infer classes of intermediate features related to eyewear product size-width relative to the face of the person.

48. The system of claim 46, wherein the features are used to infer classes of intermediate features related to eyewear product size-height relative to the face of the person.

49. The system of claim 46, wherein the features are used to infer classes of intermediate features related to eyewear product fit relative to the face of the person.

50. The system of claim 46, wherein generating the ranking comprises using predictor models to generate the ranking based on features.

51. The system of claim 39, wherein generating the ranking comprises using features created by extracting combined face and eyewear product features.

52. The system of claim 51, wherein generating the face features comprises extracting face features using deep learning models and image analysis.

53. The system of claim 51, further comprising obtaining stylistic preference feedback on a plurality of eyewear products.

54. The system of claim 53, further comprising learning user stylistic preferences on features of a plurality of eyewear product using parameters computed based on eyewear product features.

55. The system of claim 53, further comprising the ranking and evaluation of combined face and eyewear product features relative to expert ratings adjusted for user stylistic preferences.

56. The system of claim 51, wherein the features are used to infer classes of intermediate features related to eyewear product size-width relative to the face of the person.

57. The system of claim 51, wherein the features are used to infer classes of intermediate features related to eyewear product size-height relative to the face of the person.

58. The system of claim 51, wherein the features are used to infer classes of intermediate features related to eyewear product fit relative to the face of the person.

59. The system of claim 51, wherein generating the ranking comprises using predictor models to generate the ranking based on features.

60. The system of claim 51, wherein the features of the plurality of eyewear products are generated by extracting eyewear product features using deep learning models.

\* \* \* \* \*